United States Patent
Hinterstoisser

(10) Patent No.: US 9,659,217 B2
(45) Date of Patent: *May 23, 2017

(54) SYSTEMS AND METHODS FOR SCALE INVARIANT 3D OBJECT DETECTION LEVERAGING PROCESSOR ARCHITECTURE

(71) Applicant: X Development LLC, Mountain View, CA (US)

(72) Inventor: Stefan Hinterstoisser, Palo Alto, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/219,798

(22) Filed: Jul. 26, 2016

(65) Prior Publication Data

US 2016/0335496 A1 Nov. 17, 2016

Related U.S. Application Data

(63) Continuation of application No. 14/466,379, filed on Aug. 22, 2014, now Pat. No. 9,424,470.

(51) Int. Cl.
| | |
|---|---|
| *G06K 9/42* | (2006.01) |
| *G06K 9/62* | (2006.01) |
| *G06K 9/00* | (2006.01) |
| *B25J 5/00* | (2006.01) |
| *B25J 9/00* | (2006.01) |
| *B25J 19/02* | (2006.01) |
| *B25J 13/08* | (2006.01) |
| *G06K 9/66* | (2006.01) |
| *G06K 9/46* | (2006.01) |

(52) U.S. Cl.
CPC .......... *G06K 9/00664* (2013.01); *B25J 5/007* (2013.01); *B25J 9/0093* (2013.01); *B25J 13/089* (2013.01);

(Continued)

(58) Field of Classification Search
None
See application file for complete search history.

(56) References Cited

U.S. PATENT DOCUMENTS

| 7,916,933 B2 | 3/2011 | Schwartz et al. |
| 8,131,018 B2 | 3/2012 | Wilson |

(Continued)

OTHER PUBLICATIONS

Hinterstoisser, Stefan, et al. "Gradient Response Maps for Real-Time Detection of Texture-Less Objects," IEEE Transactions on Pattern Analysis and Machine Intelligence, 2012, pp. 876-888.

(Continued)

*Primary Examiner* — Brian P Werner
(74) *Attorney, Agent, or Firm* — McDonnell Boehnen Hulbert & Berghoff LLP

(57) ABSTRACT

An example method includes receiving a plurality of templates of a plurality of objects, where a template comprises feature values sampled at corresponding points of a two-dimensional grid of points positioned over a particular view of an object and scaled based on a depth of the object at the particular view. The method may further include receiving an image of an environment and determining a matrix representative of the image, where a row of the matrix comprises feature values sampled at a particular point of the two-dimensional grid positioned over one or more locations within the image and scaled based on depths of the one or more locations. The method may additionally include determining at least one similarity vector corresponding to at least one template and using the at least one similarity vector to identify at least one matching template for at least one object located within the image.

20 Claims, 15 Drawing Sheets

(52) U.S. Cl.
 CPC ........ *B25J 19/023* (2013.01); *G06K 9/00201* (2013.01); *G06K 9/00208* (2013.01); *G06K 9/4671* (2013.01); *G06K 9/6215* (2013.01); *G06K 9/66* (2013.01); *G06K 2009/4666* (2013.01); *G06K 2209/29* (2013.01); *Y10S 901/01* (2013.01); *Y10S 901/09* (2013.01); *Y10S 901/47* (2013.01)

(56) References Cited

U.S. PATENT DOCUMENTS

| | | | |
|---|---|---|---|
| 2003/0138147 A1 | 7/2003 | Ongkojoyo | |
| 2004/0066970 A1* | 4/2004 | Matsugu | G06K 9/20 382/217 |
| 2004/0071346 A1 | 4/2004 | Clark et al. | |
| 2014/0270549 A1* | 9/2014 | Vincent | G06K 9/3258 382/224 |

OTHER PUBLICATIONS

Hinterstoisser, Stefan, et al. "Model Based Training, Detection and Pose Estimation of Texture-Less 3D Objects in Heavily Cluttered Scenes," Computer Vision—ACCV, 2012, pp. 548-562, Springer Berlin Heidelberg.

Hinterstoisser, Stefan, et al. "Multimodal Templates for Real-Time Detection of Texture-Less Objects in Heavily Cluttered Scenes," IEEE International Conference on Computer Vision (ICCV), 2011, pp. 858-865.

Steger, Carsten. "Occlusion, Clutter, and Illumination Invariant Object Recognition," International Archives of Photogrammetry Remote Sensing and Spatial Information Sciences, 2002, pp. 345-350, vol. 34, No. 3/A.

* cited by examiner

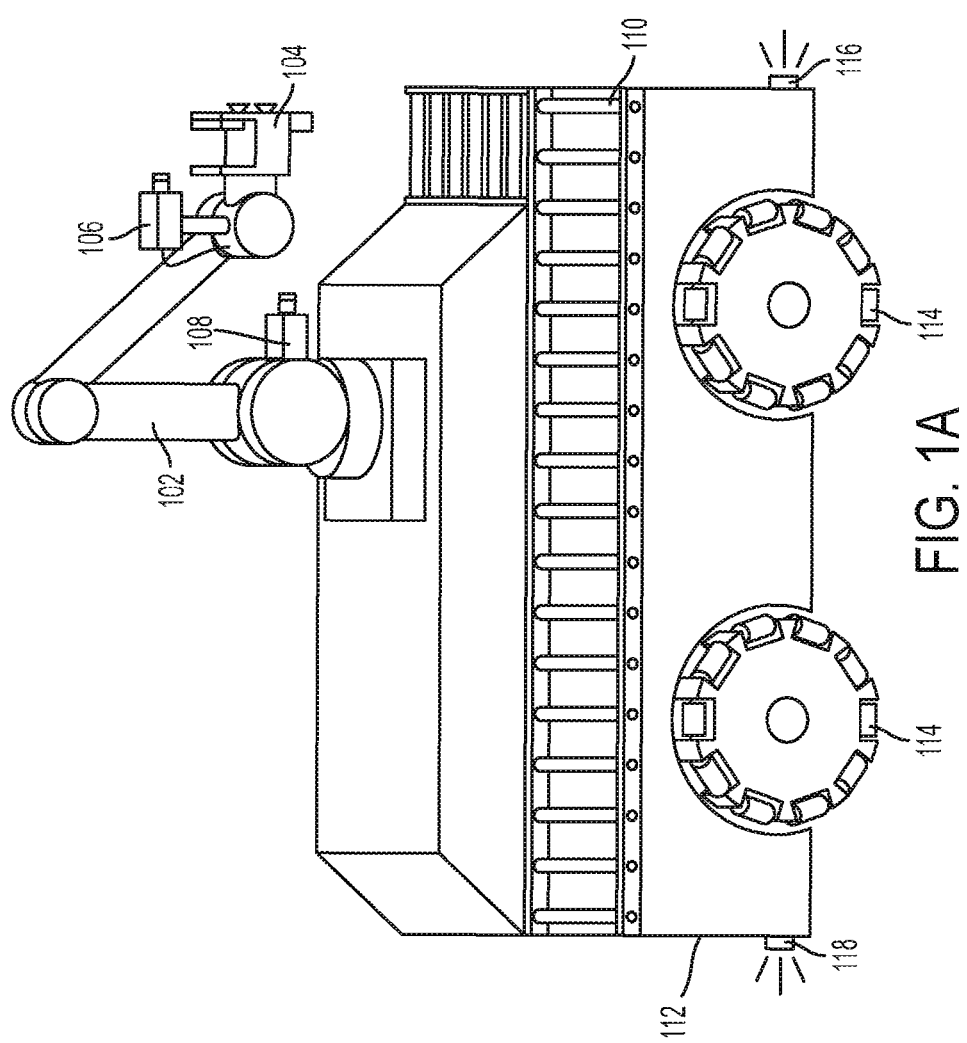

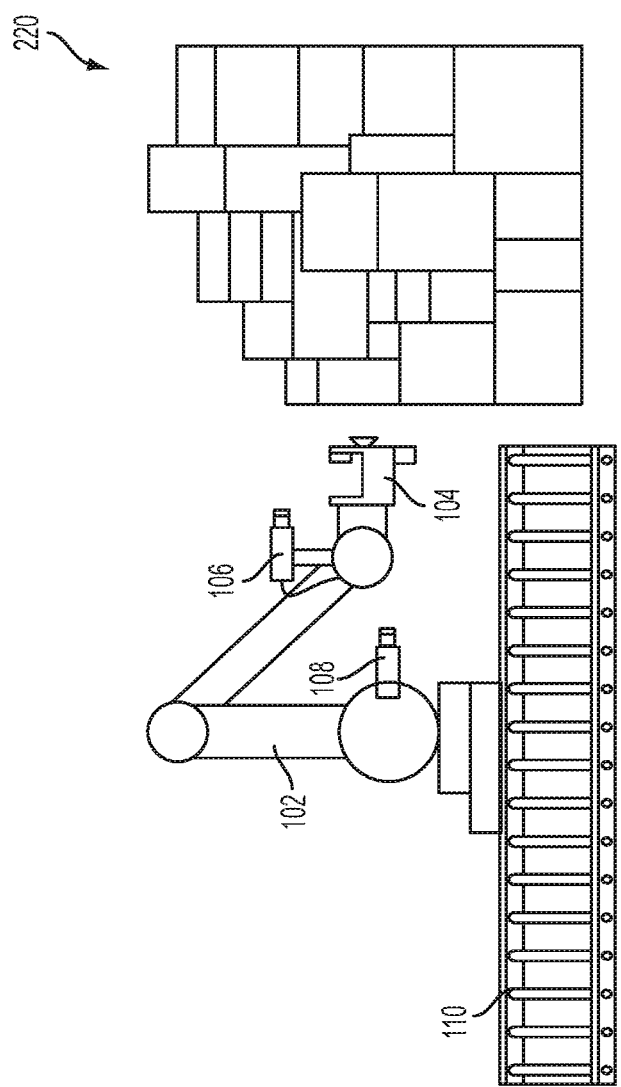

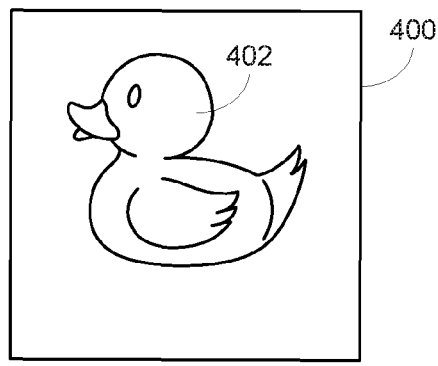
FIG. 4A
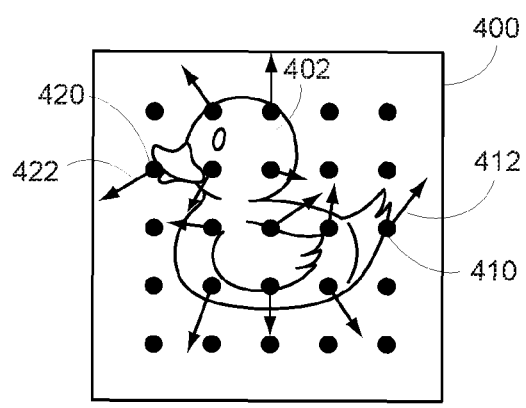
FIG. 4B
| | 120° | 90° | | |
|---|---|---|---|---|
| 210° | 240° | 330° | | |
| | 180° | 30° | 90° | 60° |
| | 240° | 270° | 300° | |
| | | | | |
FIG. 4C Response Map for 30°
660

| | | | |
|---|---|---|---|
| 1 | Cos(30° − 30°) = 1 | Cos(330° − 30°) = 0.5 | ... |
| ⋮ | | | |
| 9 | Cos(300° − 30°) = 0 | Cos(330° − 30°) = 0.5 | |
| ⋮ | | | |
| 25 | | | |

FIG. 6D

Response Map for 300°
670

| | | | |
|---|---|---|---|
| 1 | Cos(30° − 300°) = 0 | Cos(330° − 300°) = 0.87 | ... |
| ⋮ | | | |
| 9 | Cos(300° − 300°) = 1 | Cos(330° − 300°) = 0.87 | |
| ⋮ | | | |
| 25 | | | |

FIG. 6E

SYSTEMS AND METHODS FOR SCALE INVARIANT 3D OBJECT DETECTION LEVERAGING PROCESSOR ARCHITECTURE

CROSS REFERENCE TO RELATED APPLICATION

The present application is a continuation of U.S. patent application Ser. No. 14/466,379 filed on Aug. 22, 2014, entitled "Systems and Methods for Scale Invariant 3D Object Detection Leveraging Processor Architecture," the contents of which are incorporated herein by reference, as if fully set forth in this description.

BACKGROUND

Robotic systems, such as a robotic arm containing a gripping component, may be used for applications involving picking up or moving objects. For instance, a robotic device may be used to fill a container with objects, create a stack of objects, or unload objects from a truck bed. In some cases, all of the objects may be of the same type. In other cases, a container or truck may contain a mix of different types of objects, such as boxed items, cans, tires, or other stackable objects. Such robotic systems may direct a robotic arm to pick up objects based on predetermined knowledge of where objects are in the environment.

SUMMARY

The present disclosure provides systems and methods that may help to identify objects within an environment. In particular, templates of different views of objects may be generated during a training phase. A template may include feature values sampled from a particular view of an object with a grid of points whose dimensions are scaled based on a depth of the object at the particular view. During a runtime phase, an image of an environment (e.g., of a robotic device) may be received. A matrix representative of the image may then be generated containing feature values sampled with the grid of points positioned at one or more locations in the image and scaled based on depths of the one or more locations. In one example, the grid points may be numbered according to a spiral of grid points extending from the center. The feature values could come from one or multiple different modalities. The rows of the matrix may correspond to particular grid points, and the columns may correspond to the one or more grid center locations in the image. Response maps for different possible feature values may be generated such that a response map contains similarity measurements between a possible feature value and the feature values from the matrix. The response maps may then be used to determine similarity vectors for one or more templates which indicate the similarity between the templates and different locations in the image. In particular, rows corresponding to grid points may be selected from the response maps for different features values in the templates at the grid points. The rows may then be combined (e.g., added) to determine the similarity vectors. The similarity vectors may be used to identify one or more matching templates for one or more objects within the image.

In one example, a method is provided that includes receiving a plurality of templates of a plurality of objects, where a template comprises a plurality of feature values sampled at corresponding points of a two-dimensional grid of points positioned over a particular view of an object and scaled based on a depth of the object at the particular view. The method may further include receiving an image of an environment. The method may also include determining, by a computing device, a matrix representative of the image, where a row of the matrix comprises feature values sampled at a particular point of the two-dimensional grid positioned over one or more locations within the image and scaled based on depths of the one or more locations within the image. The method may additionally include determining a plurality of response maps for corresponding feature values, where a response map for a particular feature value comprises similarity measurements between the particular feature value and feature values from the matrix representative of the image. The method may further include determining at least one similarity vector corresponding to at least one template from the plurality of templates based on a combination of rows selected from one or more of the response maps for feature values in the at least one template at corresponding points of the two-dimensional grid. The method may also include using the at least one similarity vector to identify at least one matching template for at least one object located within the image of the environment.

In a further example, a non-transitory computer readable medium having stored therein instructions, that when executed by a computing system, cause the computing system to perform functions is disclosed. The functions may include receiving a plurality of templates of a plurality of objects, where a template comprises a plurality of feature values sampled at corresponding points of a two-dimensional grid of points positioned over a particular view of an object and scaled based on a depth of the object at the particular view. The functions may further include receiving an image of an environment. The functions may also include determining a matrix representative of the image, where a row of the matrix comprises feature values sampled at a particular point of the two-dimensional grid positioned over one or more locations within the image and scaled based on depths of the one or more locations within the image. The functions may additionally include determining a plurality of response maps for corresponding feature values, where a response map for a particular feature value comprises similarity measurements between the particular feature value and feature values from the matrix representative of the image. The functions may further include determining at least one similarity vector corresponding to at least one template from the plurality of templates based on a combination of rows selected from one or more of the response maps for feature values in the at least one template at corresponding points of the two-dimensional grid. The functions may also include using the at least one similarity vector to identify at least one matching template for at least one object located within the image of the environment.

In another example, a system is disclosed including at least one optical sensor and a control system. The control system may be configured to receive a plurality of templates of a plurality of objects, wherein a template comprises a plurality of feature values sampled at corresponding points of a two-dimensional grid of points positioned over a particular view of an object and scaled based on a depth of the object at the particular view. The control system may also be configured to receive an image of an environment from the at least one optical sensor. The control system may further be configured to determine a matrix representative of the image, wherein a row of the matrix comprises feature values sampled at a particular point of the two-dimensional grid positioned over one or more locations within the image and scaled based on depths of the one or more locations within the image. The control system may additionally be configured to determine a plurality of response maps for corresponding feature values, where a response map for a particular feature value comprises similarity measurements between the particular feature value and feature values from the matrix representative of the image. The control system may further be configured to determine at least one similarity vector corresponding to at least one template from the plurality of templates based on a combination of rows selected from one or more of the response maps for feature values in the at least one template at corresponding points of the two-dimensional grid. The control system may further be configured to use the at least one similarity vector to identify at least one matching template for at least one object located within the image of the environment.

In yet another example, a system may include means for receiving a plurality of templates of a plurality of objects, where a template comprises a plurality of feature values sampled at corresponding points of a two-dimensional grid of points positioned over a particular view of an object and scaled based on a depth of the object at the particular view. The system may further include means for receiving an image of an environment. The system may also include means for determining a matrix representative of the image, where a row of the matrix comprises feature values sampled at a particular point of the two-dimensional grid positioned over one or more locations within the image and scaled based on depths of the one or more locations within the image. The system may additionally include means for determining a plurality of response maps for corresponding feature values, where a response map for a particular feature value comprises similarity measurements between the particular feature value and feature values from the matrix representative of the image. The system may further include means for determining at least one similarity vector corresponding to at least one template from the plurality of templates based on a combination of rows selected from one or more of the response maps for feature values in the at least one template at corresponding points of the two-dimensional grid. The system may also include means for using the at least one similarity vector to identify at least one matching template for at least one object located within the image of the environment.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 1A shows a robotic arm mounted on a moveable cart, according to an example embodiment.

FIG. 2A shows a robotic arm and a stack of boxes, according to an example embodiment.

FIG. 4A shows an image of an object, according to an example embodiment.

FIG. 4B shows features from the image of the object from FIG. 4A sampled at a grid of points, according to an example embodiment.

FIG. 4C illustrates a template for the image of the object from FIG. 4A, according to an example embodiment.

FIG. 6D illustrates a portion of an example response map, according to an example embodiment.

FIG. 6E illustrates a portion of another example response map, according to an example embodiment.

DETAILED DESCRIPTION

Figure 1B:
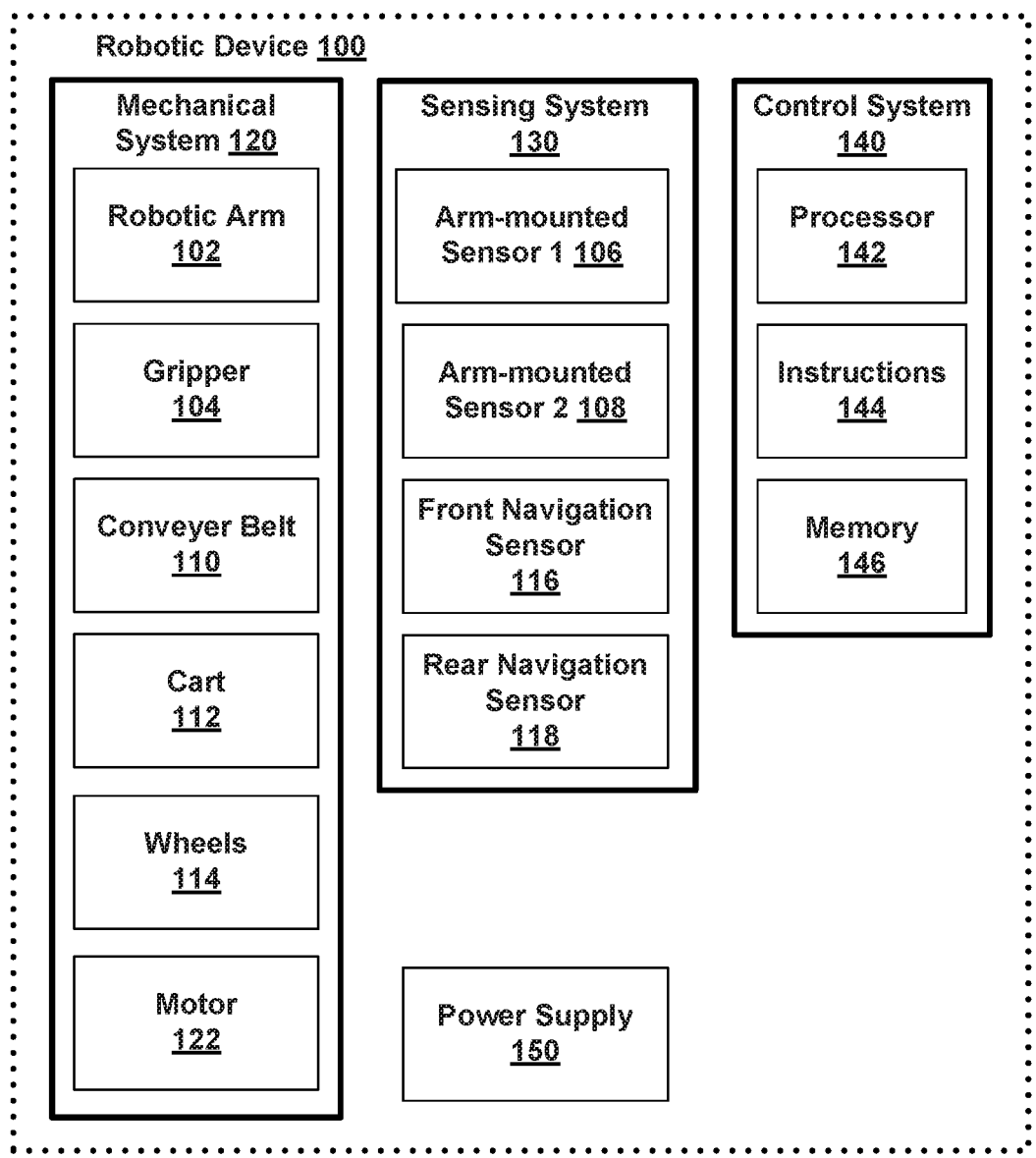
FIG. 1B is a functional block diagram illustrating a robotic device, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

Systems and methods for object recognition may be useful in a number of applications, including robotics or other types of automated systems. For instance, a robot may need to quickly identify particular objects within cluttered environments, including objects which lack texture or easily identifiable traits. In some examples, template matching may be used to identify a detected object by matching the object with a predetermined template representing a known or previously identified object. During a training phase, a group of templates representing different viewpoints of objects may first be accumulated. Then during runtime, the templates may be searched to find matching templates to identify objects within the environment. In some examples, template matching systems that search large numbers of templates to identify detected objects may be computationally expensive.

Within examples, a scale invariant template matching system may account for depth to reduce the number of templates needed to find a match. In particular, rather than storing and searching multiple templates representing a view of an object from different distances, only a single template representing a particular view of the object irrespective of depth may be needed. In some examples, a scale invariant system that accounts for depth may allow for faster or more efficient template matching. In further examples, a scale invariant system may allow more precise templates to be searched at the same framerate as a system that does not account for depth to find matching templates, which may provide increased robustness as well or instead.

During a training phase for a scale invariant system, templates may be generated by sampling particular views of objects with a two-dimensional (e.g., 5×5 or 11×11) grid of points with dimensions that are scaled based on depth. In particular, the grid dimensions may be scaled based on a depth of an object (e.g., a center pixel of the object) from a particular captured view of the object. One or more feature values that can be quantified (e.g., image gradient angles or surface normals) may then be sampled from the object at one or more points from the scaled grid of points to determine a template for the particular view of the object. In some cases, only certain points with strong feature values and/or highly discriminative features may be saved in the template.

In further examples, the grid dimensions for the grid of points may be scaled based on depth by scaling relative to a predefined canonical depth. For instance, the canonical depth may set to the largest expected viewing range of a camera used to capture views of objects. As a specific example, the canonical depth may be set to 1 meter and a detected object may have a depth of 0.5 meters. In that case, the grid of points may be scaled by a factor of 2 to account for the larger size of the object in the image at 0.5 meters than it would have at 1 meter.

During runtime for a scale invariant template matching system, an image of the environment may be received (e.g., from a camera on a robot) that may contain one or more objects to identify. To search for one or more matching templates for objects within the image, feature values at different locations within the image may be determined. In particular, a grid with the same number of grid points as used to determine the templates may be positioned at different locations within the image. For instance, the grid of points may be centered over every eighth pixel. The grid of points may then be scaled based on the depth of each of the locations within the image (e.g., by scaling based on a depth of a center pixel relative to the predefined canonical depth). The feature values at the points of the grid may then be determined from the image for purposes of comparison with the templates learned during training.

In further examples, the feature values from an image may be stored in a matrix to facilitate computations. In particular, each row of the matrix may represent a particular grid point (e.g., 100 rows for a 10×10 grid). Additionally, each column of the matrix may represent a particular location in the image (e.g., 1,000 columns if the grid is positioned over 1,000 different center pixels to sample feature values from the image).

By using this matrix format, the similarity between a particular template and different locations in the image may be computed with greater efficiency. More specifically, response maps may first be generated for different possible feature values, indicating the similarity between possible feature values and values in the matrix. For instance, in one example, the feature values may be color gradient angles, and the similarity may be measured between two angles by determining the cosine of the difference angle. A response map for a particular feature value (e.g., a particular angle) may then contain the similarity between the particular feature value and each feature value stored in the matrix. Other functions resulting in a quantifiable similarity metric may also be used. Then, to determine similarity for a particular template, rows of the response maps for feature values in the template at each relevant grid point may be selected. These rows or vectors of similarity measurements may then be combined (e.g., added together or averaged together) to form a single similarity vector between the template and each sampled location in the image. Any strong response values (e.g., above a threshold level) in the similarity vector may indicate locations in the image that match the template. The similarity vector may therefore be used to identify matching templates for one or more objects within the image.

In further examples, the matrix representative of the image may only need to be determined and stored once for each image. The matrix may then be used to search hundreds or thousands of templates for matching objects within the image. In additional examples, the rows of the matrix may be stored linearly in memory (e.g., as a vector of vectors). Vector operations may then be used to combine (e.g., sum or average) rows together with greater speed and efficiency than may be required for computations on individual elements while searching for matching templates.

In additional examples, the rows of the matrix may be ordered based on a numbering of the points of the grid that allows for expansion of the grid without recreating the entire matrix. For instance, the points of the grid may be numbered in a spiral manner, starting from the center of the grid and increasing as the spiral extends outward from the center point. During the template matching process, it may be determined that larger templates may be needed to identify one or more objects within an image (e.g., 11×11 templates when feature values were previously computed only for a 7×7 grid of points). In such an example, the grid of points may then be expanded to the needed size by extending the spiral of grid points to number additional grid points. Feature values may then be computed from the image for the additional grid points and added to the matrix by adding additional rows to the bottom of the matrix without modifying the previously stored matrix values.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

According to various embodiments, described herein are methods and systems for automated loading and/or unloading of boxes and/or other objects, such as into a storage container or from a vehicle. In some example embodiments, boxes or objects may be automatically organized and placed onto pallets. Within examples, automating the process of loading/unloading trucks and/or the process of creating pallets from objects for easier storage and transport may provide a number of industrial and business advantages.

According to various embodiments, automating the process of loading/unloading trucks and/or the process of creating pallets may include the incorporation of one or more robotic devices to move objects or perform other functions. In some embodiments, a robotic device can be made mobile by coupling with a wheeled base, a holonomic base (e.g., a base that can move in any direction), or rails on the ceiling, walls or floors. In some embodiments, the base can be an elevated base.

In some examples, a system including one or more sensors, one or more computers, and one or more robotic arms is described. The sensors may scan an environment containing one or more objects in order to capture visual data and/or three-dimensional (3D) depth information. Data from the scans may then be integrated into a representation of larger areas in order to provide digital environment reconstruction. In additional examples, the reconstructed environment may then be used for identifying objects to pick up, determining pick positions for objects, and/or planning collision-free trajectories for the one or more robotic arms and/or a mobile base.

As used herein, the term "boxes" will refer to any object or item that can be placed onto a pallet or loaded onto or unloaded from a truck or container. For example, in addition to rectangular solids, "boxes" can refer to cans, drums, tires or any other "simple" shaped geometric items. Additionally, "loading" and "unloading" can each be used to imply the other. For example, if an example describes a method for loading a truck, it is to be understood that substantially the same method can also be used for unloading the truck as well. As used herein, "palletizing" refers to loading boxes onto a pallet and stacking or arranging the boxes in a way such that the boxes on the pallet can be stored or transported on the pallet. In addition, the terms "palletizing" and "depalletizing" can each be used to imply the other.

Of course, examples herein may be applied toward objects other than boxes as well, and toward objects of various sizes and shapes.

According to various embodiments, a robotic manipulator may be mounted on a holonomic cart (e.g., a cart with wheels that allow the cart to move in any direction). FIG. 1A depicts an exemplary holonomic cart containing a robotic manipulator. In some embodiments, a moveable cart 112 may include a robotic arm 102 mounted on the cart 112. The robotic arm 102 may contain a gripping component 104 for gripping objects within the environment. The cart may contain one or more wheels 114, which may be holonomic wheels that operate with two degrees of freedom. In further embodiments, a wrap around front conveyor belt 110 may be included on the holonomic cart 112. In some examples, the wrap around front conveyer belt may allow the robot to not have to rotate its gripper to the left or right when unloading or loading boxes from or to a truck container or pallet.

In other examples, the robotic manipulator may be mounted on a different type of movable apparatus or may not be mounted on a movable base at all. For example, the robotic manipulator may be mounted at a fixed position within a factory setting. In other example embodiments, one or more robotic manipulators may be mounted on rails of a truck or container. In such examples, the robotic manipulators may be used to load or unload the truck or container.

FIG. 1B is a functional block diagram illustrating a robotic device 100, according to an example embodiment. The robotic device 100 could include various subsystems such as a mechanical system 120, a sensing system 130, a control system 140, as well as a power supply 150. The robotic device 100 may include more or fewer subsystems and each subsystem could include multiple elements. Further, each of the subsystems and elements of robotic device 100 could be interconnected. Thus, one or more of the described functions of the robotic device 100 may be divided up into additional functional or physical components, or combined into fewer functional or physical components. In some further examples, additional functional and/or physical components may be added to the examples illustrated by FIGS. 1A and 1B.

The mechanical system 120 may include components described above with respect to FIG. 1A, including a robotic arm 102, a gripper 104, a conveyer belt 110, a (movable or holonomic) cart 112, and one or more wheels 114. The mechanical system 120 may additionally include a motor 122, which may be an electric motor powered by electrical power, or may be powered by a number of different energy sources, such as a gas-based fuel or solar power. Additionally, motor 122 may be configured to receive power from power supply 150. The power supply 150 may provide power to various components of robotic device 100 and could represent, for example, a rechargeable lithium-ion or lead-acid battery. In an example embodiment, one or more banks of such batteries could be configured to provide electrical power. Other power supply materials and types are also possible.

The sensing system 130 may use one or more sensors attached to a robotic arm 102, such as sensor 106 and sensor 108, which may be 2D sensors and/or 3D depth sensors that sense information about the environment as the robotic arm 102 moves. The sensing system may determine information about the environment that can be used by control system 140 (e.g., a computer running motion planning software) to pick and move boxes efficiently. The control system 140 could be located on the device or could be in remote communication with the device. In further examples, scans from one or more 2D or 3D sensors with fixed mounts on a mobile base, such as a front navigation sensor 116 and a rear navigation sensor 118, and one or more sensors mounted on a robotic arm, such as sensor 106 and sensor 108, may be integrated to build up a digital model of the environment, including the sides, floor, ceiling, and/or front wall of a truck or other container. Using this information, the control system 140 may cause the mobile base to navigate into a position for unloading or loading.

In additional examples, planar surface information may be extracted from 3D sensors to model walls, floor and/or box faces. After modeling the floor, projection of objects onto the floor plane may enable segmentation of obstacles and/or target objects such as boxes. Floor-plane projection can also be used to model the corrugated sides of a container or truck, which may not be accurately modeled as planes. In further examples, sidewall angles, floor plane roll and pitch, and/or distance from side walls can be used to maneuver a mobile base into a container without collisions. Use of extended 3D information rather than a single line scan may help make the extraction of navigation information robust. For example, the side walls may have a vertical extent that is captured by the 3D sensor. Scanning systems that use a single line of depth information may be slower if they scan vertically and/or less robust because they acquire less information. In additional examples, front plane modeling can determine the distance to a next group of objects to pick in truck unloading.

In further examples, the robotic arm 102 may be equipped with a gripper 104, such as a digital suction grid gripper. In such embodiments, the gripper may include one or more suction valves that can be turned on or off either by remote sensing, or single point distance measurement and/or by detecting whether suction is achieved. In additional examples, the digital suction grid gripper may include an articulated extension. In some embodiments, the potential to actuate suction grippers with rheological fluids or powders may enable extra gripping on objects with high curvatures.

In some embodiments, the gripper could potentially span several boxes or objects and turn on suction for some or all of the covered objects. In some embodiments, the suction or adhesion devices may be a "digital" grid so that the robotic device can turn on any number of the suction devices as will fit boxes sensed for grabbing. In some implementations, the system may notice a seam in the boxes (separation between adjacent boxes) such that suckers can be activated on both sides of the seam to pick up both boxes at once, thereby doubling the throughput. In some embodiments, the suckers can sense after a certain amount time whether they can successfully grip a surface, after which they may automatically shut off. In further embodiments, sections of the suckers can fold down to grasp the top of the boxes. For instance, grippers can initially start at full extension and then conform to the surface being gripped.

In further examples, the robotic arm can implement a wiggle movement to improve a suction grip. In additional embodiments, the robotic arm can wiggle a box side to side to help segment the box from its surroundings. In other embodiments, the arm can wiggle upon pick up of the box to avoid jostling other objects. In such embodiments, when trying to adhere to an object in order to pick it up using suction, the robotic arm may employ a wiggle motion in order to make a firm seal against the object. In further examples, the robotic arm may wiggle the object as the robotic arm is picking up the object so that the box can more gently break friction or overlap contact with other items. This may help avoid a situation where pulling the object up too directly or too quickly causes other items to be tossed into the air.

According to various embodiments, cardboard boxes can have concave, convex or otherwise rumpled faces that make it hard for a suction device to adhere to. Thus, wiggling the suction device as the device makes suction contact may enable a more reliable grip on cardboard boxes and other non-planar objects. In further examples, when first grabbing a box, a few center suction devices can be turned on and the arm can wiggle back and forth as it starts to pull the box out. This may break surface adhesion with other boxes and help to start to pull the box out. Once the box is at least partially pulled out, the box may then be segmented from the other boxes more easily. In some embodiments, wiggling while picking up an object in clutter may remove other objects from the picked up object, thereby preventing unwanted pick up of surrounding objects.

According to various embodiments, segmentation of items may be necessary for successful grasping. In some embodiments, a smooth surface patch may belong to two separate objects. In such instances, manipulator interaction with the objects may be used to perturb the scene to better segment the objects from each other. For motion separation, the natural or forced movement of objects on a conveyor, on a slide, moving in a tote, and/or actively jostled within a tote may be tracked by optical flow, parallax, or time delayed views to calculate stereo depth in order to enhance object segmentation.

In other examples, one or more of the sensors used by a sensing system may be a RGBaD (RGB+active Depth) color or monochrome camera registered to a depth sensing device that uses active vision techniques such as projecting a pattern into a scene to enable depth triangulation between the camera or cameras and the known offset pattern projector. This type of sensor data may help enable robust segmentation. According to various embodiments, cues such as barcodes, texture coherence, color, 3D surface properties, or printed text on the surface may also be used to identify an object and/or find its pose in order to know where and/or how to place the object (e.g., fitting the object into a fixture receptacle). In some embodiments, shadow or texture differences may be employed to segment objects as well.

Many or all of the functions of robotic device 100 could be controlled by control system 140. Control system 140 may include at least one processor 142 (which could include at least one microprocessor) that executes instructions 144 stored in a non-transitory computer readable medium, such as the memory 146. The control system 140 may also represent a plurality of computing devices that may serve to control individual components or subsystems of the robotic device 100 in a distributed fashion.

In some embodiments, memory 146 may contain instructions 144 (e.g., program logic) executable by the processor 142 to execute various functions of robotic device 100, including those described above in connection with FIGS. 1A-1B. Memory 146 may contain additional instructions as well, including instructions to transmit data to, receive data from, interact with, and/or control one or more of the mechanical system 120, the sensor system 130, and/or the control system 140.

According to various embodiments, a perception-guided robot is described. For instance, a robotic device may utilize a combination of perception together with planning to guide the robot arm to pick up a box and place it where it needs to go. FIG. 2A illustrates part of the robotic device from FIG. 1A with a stack of boxes, according to an example embodiment. As shown, the robotic device may include a robotic arm 102 with a gripping component 104, sensors 106 and 108, and conveyer 110 as described above. In some examples, the robotic device could be mounted on a holonomic cart as described with respect to FIG. 1A, could be mounted on a different type of movable apparatus, could be mounted on rails or tracks, or could be stationary. The robotic device may be controlled to pick boxes from a stack of boxes 220 containing a heterogenous mix of shapes and sizes of boxes.

Figure 2B:
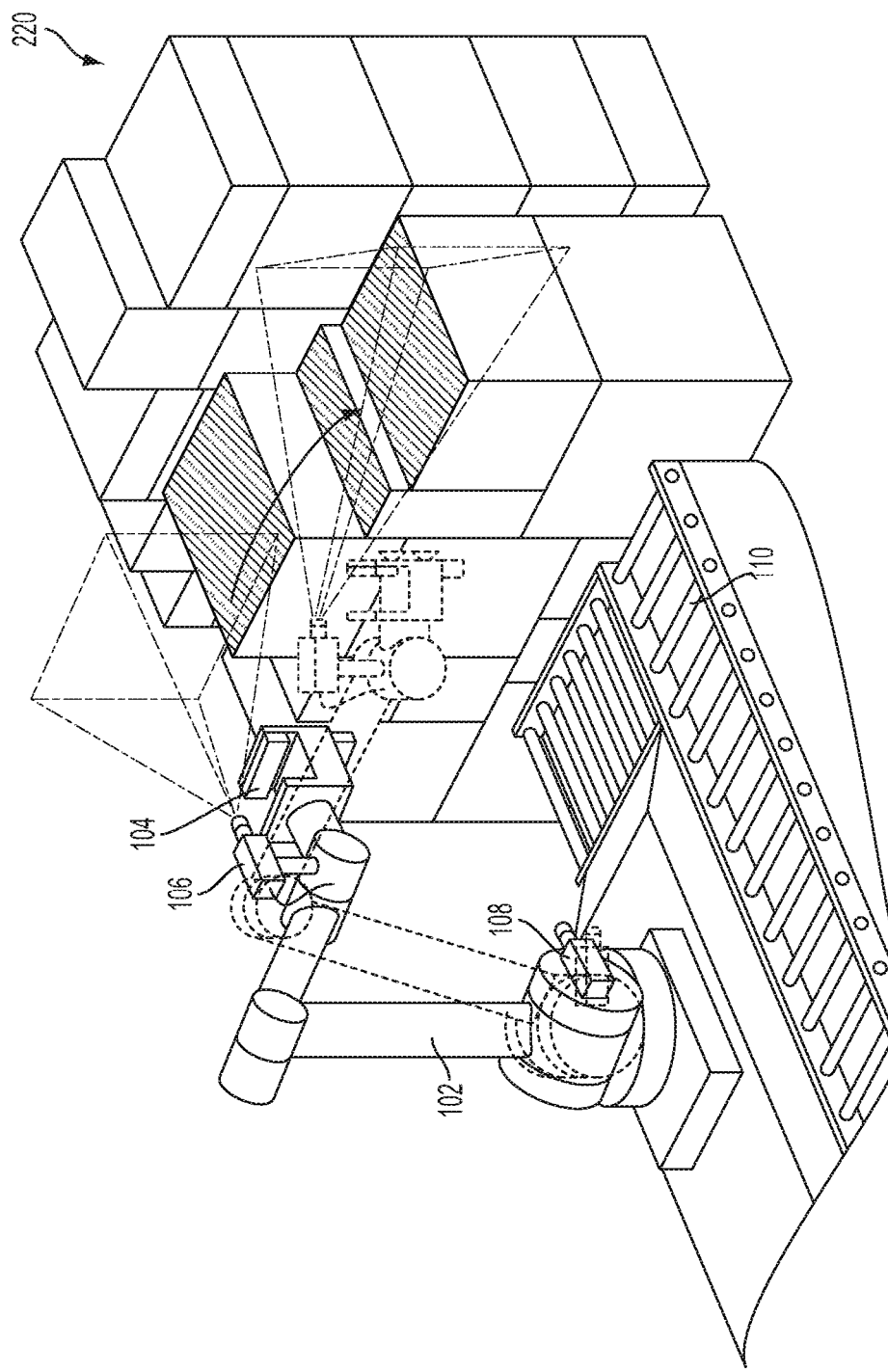
FIG. 2B shows scanning of the stack of boxes from FIG. 2A by a sensor mounted on the robotic arm, according to an example embodiment.

Within examples, a virtual environment including a model of the objects in 2D and/or 3D may be determined and used to develop a plan or strategy for picking up the boxes. In some examples, the robot may use one or more sensors to scan an environment containing objects, as shown in FIG. 2B. As the robotic arm 102 moves, a sensor 106 on the arm may capture sensor data about the stack of boxes 220 in order to determine shapes and/or positions of individual boxes. In additional examples, a larger picture of a 3D environment may be built up by integrating information from individual (e.g., 3D) scans. Sensors performing these scans may be placed in fixed positions, on a robotic arm, and/or in other locations. According to various embodiments, scans may be constructed and used in accordance with any or all of a number of different techniques.

In some examples, scans can be made by moving a robotic arm upon which one or more 3D sensors are mounted. Feedback from the arm position may provide pose information about where the sensor is positioned and may be used to help with the integration. Alternately, or additionally, scans may be made using one or more 2D sensors, for instance by leveraging motion and tracking keypoints in the environment. In further examples, scans may be from fixed-mount cameras that have fields of view (FOVs) covering a given field. In additional examples, scans may be visually registered to help with fine pose estimation, potentially giving better integration results.

In further examples, a virtual environment may be built up using a 3D volumetric or surface model to integrate information (e.g., from different sensors). This may allow the system to operate within a larger environment, such as in cases where one sensor may be insufficient to cover a large environment. Such techniques may also increase the level of detail captured, which may help the robotic device perform various tasks. In particular, integrating information can yield finer detail than from a single scan alone (e.g., by bringing down noise levels). This may make possible better object detection, surface picking, or other applications.

In further examples, wide-angle environment reconstruction may be performed by sensing an environment and extracting that information into a simplified geometric model of simple mathematical 3D geometric forms (e.g., planes, cylinders, cones, hemispheres, etc). In some instances, such techniques may make motion planning easier and/or may make violation of the models (e.g., collisions) easier to detect. Alternately, or additionally, such techniques may allow a parametric description to extend the environment. For instance, the ground may be treated as a plane that extends behind objects that occlude it.

In additional examples, planes or other mathematical surfaces in the environment may be extracted in 3D. These known "ideal" surface detections may be combined into a more accurate model of the environment. For instance, planes may be used to determine the full extents of walls (or mathematical description thereof) and other obstacles to avoid collisions and detect where objects of interest are. Also, mathematical representations of objects may be used to look for anomalies such as when person enters into an environment. Such events may violate the ideal model, which may make their detection easier.

In other examples, certain objects such as boxes may have simple planar form. For instance, a metal can may have a geometric form of a cylinder and a tire may have a geometric form of a torus. Example systems may leverage this trait of certain objects in order model them and/or determine how to motion plan for the objects. For instance, known templates of certain shapes can be used to refine detected features of objects within the environment that appear to match a particular shape.

In some examples, 2D and 3D information may be represented at least in part via one or more facades. A facade may be defined as a near-planar construct containing a set of objects, represented as a depth map (e.g., a 2D map of distances as the third dimension). Examples of facades may include the wall of boxes in a truck, the top of a pallet stack containing boxes or other objects, or the top of a bin of jumbled objects.

Figure 2C:
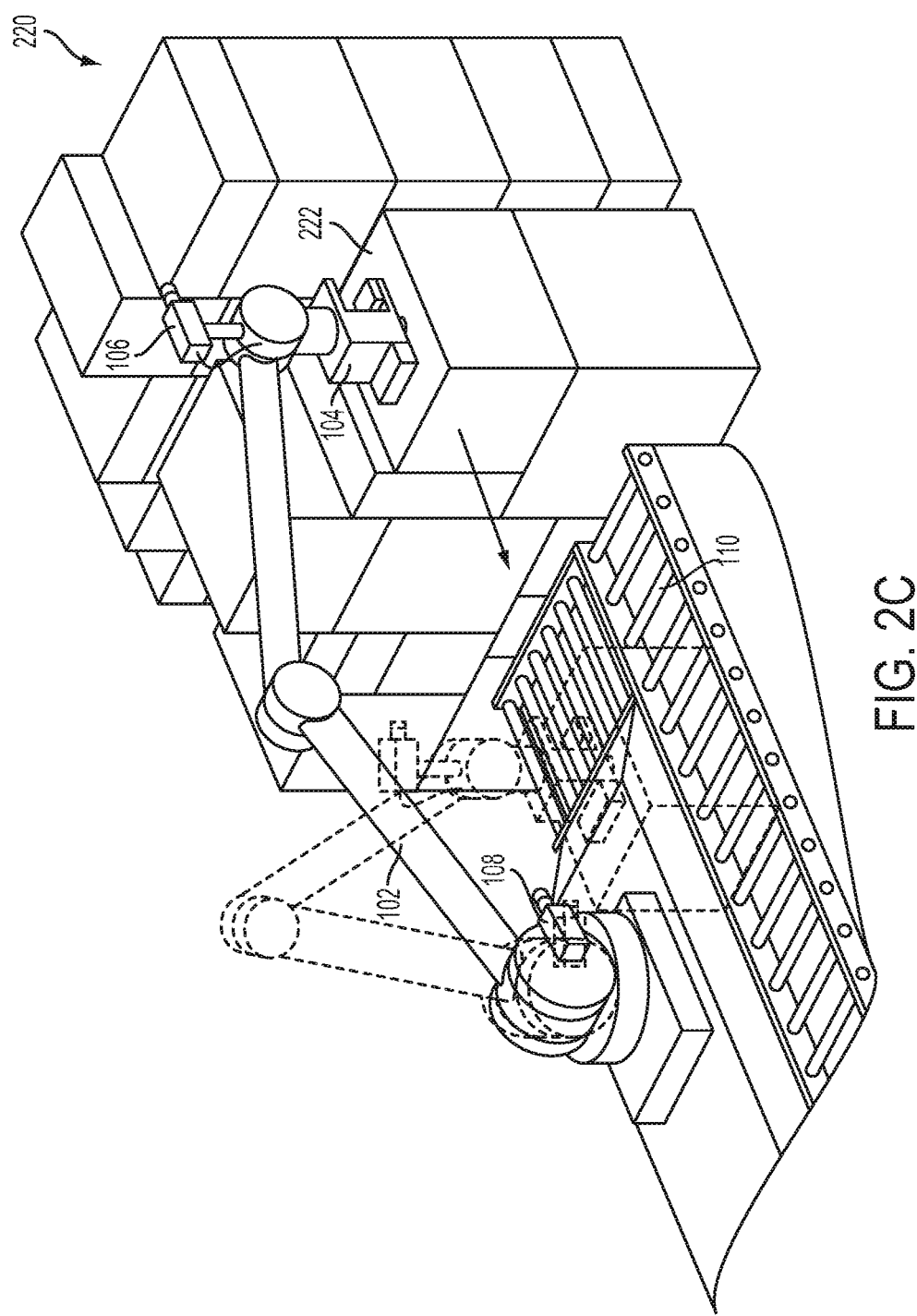
FIG. 2C shows the robotic arm from FIG. 2A moving a box, according to an example embodiment.

In further examples, a facade may be constructed from boxes, for instance to plan in what order the boxes should be picked up. For instance, as shown in FIG. 2C, box 222 may be identified by the robotic device as the next box to pick up. Box 222 may be identified within a facade representing a front wall of the stack of boxes 220 constructed based on sensor data collected by one or more sensors, such as sensor 106 and 108. A control system may then determine that box 222 is the next box to pick, possibly based on its shape and size, its position on top of the stack of boxes 220, and/or based on characteristics of a target container or location for the boxes. The robotic arm 102 may then be controlled to pick up the box 222 using gripper 104 and place the box 222 onto the conveyer belt 110 (e.g., to transport box 222 into a storage area).

In additional examples, a facade may be represented as an orthographic projection of 3D surface information. This representation may allow for parsing the facade to determine interesting areas for a particular application. For example, in truck unloading, the upper left corner of the next box to pick may be determined based on a facade representation. In other examples, an orthographic projection of integrated 3D environment may be determined to give a wide-FOV, easily-parsed representation for performing application-related tasks. One such task may be finding the corner or corners (e.g., top left) of a box to pick. Another such task may involve finding good surfaces (e.g., relatively flat and large) for picking objects out of a bin.

In further examples, a 3D model of a stack of boxes may be constructed and used as a model to help plan and track progress for loading/unloading boxes to/from a stack or pallet. Any one actual camera view of the facade may suffer from point of view occlusions and perspective distortion. Accordingly, multiple RGBD views via robot arm movements and/or different views from a cart base or fixed locations may be combine to create a single facade of the boxes to be picked.

In other examples, the 3D model may be used for collision avoidance. Within examples, planning a collision-free trajectory may involve determining the 3D location of objects and surfaces in the environment. A trajectory optimizer may make use of the 3D information provided by environment reconstruction to optimize paths in the presence of obstacles. In further examples, the optimizer may work in real time and may accept many kinds of constraints. As an example of such a constraint, the optimizer may attempt to keep the end effector level throughout the trajectory.

In additional examples, an environment may be captured as a mesh or set of 3D points. A robot arm may be represented as a convex hull of plane segments for quick collision checking. Constant or frequent updating of the environment may allow the robot arm to quickly respond to changes. In further examples, an optimizer may perform frequent continuous collision checking throughout its path. An optimizer may accept arbitrary constraints in the form of costs, such as to keep a certain distance away from objects or to approach a goal position from a given angle. Additionally, an optimizer may avoid robot fault conditions by working in joint space, keeping track of windup and choosing goal positions from among multiple inverse kinematics solutions. One strategy for motion planning may involve looking ahead several moves to see if the chosen goal joint position will be acceptable for the next move.

In some embodiments, path constraints, such as collision avoidance for robotic arms, cameras, cables, and/or other components, may be put in a constraint based planning solver and solved for to yield a best path to move the arm for perception. Additionally, in some embodiments, the solver may determine a best path for picking up, moving, and placing an object.

According to various embodiments, 3D and/or visual sensors may be calibrated to determine their pose with respect to the workspace. In the case of fixed sensors, the calibration may determine their fixed pose in the workspace. In the case of a sensor on the arm, calibration may determine the offset pose of the sensor from the arm link to which it is attached.

Within examples, calibration techniques may allow for the calibration of an arbitrary number of sensors in the workspace. Calibration may involve determining some or all of a variety of parameters and coefficients. For example, calibration may solve for one or more intrinsic parameters such as focal length and image center. As another example, calibration may determine one or more distortion coefficients such as models of radial and tangential distortion. As yet another example, calibration may solve for one or more extrinsic parameters, where the object is in a scene relative to a pattern or other sensors that identified the same pattern in a scene.

In some examples, calibration may be performed at least in part by using a calibration pattern, which may be a known set of features in 2D or 3D. For instance, a known pattern of dots may be used, where the distance between each dot and the other dots is known. Calibration may be performed at least in part by collecting multiple different views of an object. In further examples, capturing multiple views of a calibration pattern in different positions may allow for (1) calibration of the one or more coefficients of the camera and/or (2) knowledge of where the camera is relative to the coordinate system established by where the calibration pattern was fixed. In particular embodiments, a camera in the scene may identify a calibration pattern on the robot arm while a camera on the arm identifies a calibration pattern in the scene simultaneously.

In additional examples, calibration may involve a camera fixed in a scene. In this case, a calibration pattern may be placed on a robotic arm. The robotic arm may be configured to move through the scene as multiple views of the calibration pattern on the robotic arm are collected. This may help to calibrate the camera and/or be useful for relating the coordinate system of the camera to that of the robot. Further, the relation of each device to the other can be determined by each device as the robotic arm moves.

In certain examples, calibration may involve a camera located on a robotic arm. A calibration pattern may be mounted on a wall or table. Then, the camera may be moved around, collecting multiple views of the calibration pattern from different robot or robotic arm positions. When different 3D or 2D views (e.g., 2, 20, 200) are collected, these views can be used to solve for the calibration relationships. After calibration, when the camera on the arm moves, the system can determine where it is relative to the coordinate system set based on the location of the calibration pattern in the scene. In particular embodiments, both the calibration pattern and the camera may be movable. For example, the calibration pattern may be located on a conveyor belt where the robotic arm may be configured to place boxes. After calibration, the system may determine where the camera was relative to that spot on the conveyor belt.

In further examples, nonlinear optimization may be performed in a two-stage process for robust estimation of 3D sensor calibration. In one stage, an initialization may be derived from the relative pose offsets of the target and the sensors. In another stage, given the initialization, a batch bundle adjustment may be used to find the optimal pose of the cameras together with the target points. Calibration can be extended to the estimation of robot parameters such as joint lengths and joint angle offsets.

In other examples, known, precise, robot motion of the camera over a calibration pattern, or a calibration pattern over a camera may be used to improve calibration results. For instance, information about precisely how the camera moves may be used to obtain more accurate camera calibration. That is, if the camera is moved 50 mm right, the corresponding (perspective projection) amount of movement from the calibration object may be detected. This information may be used to jointly or separately optimize the calibration and tracking parameters.

In additional examples, a robot can look at its ongoing calibration and move in such a way as to maximize information for better calibration. For example, it can detect that some view areas have not been seen and go to those views.

In further examples, a system for the practical manipulation of heterogeneous, categorical items, generally from a cluttered collection area to a defined bin, is presented. In some embodiments, the pick location containing the items may not be sensitive to precise object orientation(s) and items may be mixed together. In additional examples, the place location for the items may or may not be sensitive to object orientation. In some examples, the pick-and-place regions may be defined as 3D regions acceptable for picking or placing an object, with some tolerance. The pick-and-place region may be highly cluttered with similar and/or disparate objects. In other embodiments, the items may come from or be put into a fixture, such as metal or plastic snaps that hold the sorted item in a particular orientation.

In additional examples, environment modeling of both the pick-and-place location may be used for intelligent grasp location and motion, as well as event reporting (e.g., when a place region is full or a pick region is empty). In some examples, object bounding volumes may be computed and/or distinguishing features of objects may be found (such as textures, colors, barcodes or OCR). In some embodiments, objects may be sorted into an assigned destination location by matching against a database of location assignments indexed by object type or object ID. For instance, an object's locations may be derived from reading a barcode, considering the size of the object, and/or by recognizing a particular kind of object.

In some examples, a plan for a robotic device may be determined in order to achieve certain configurations of the objects within a target location for the objects. For instance, the goals for loading/unloading or constructing/deconstructing pallets may be to achieve: 1) a dense packing with minimal air gaps in between boxes, and/or 2) a stable packing that won't easily collapse. In some embodiments, stability may require that, in general, heavy objects are on the bottom, and light objects are on top. In other examples, pallets may be created in order to avoid non-interlaced column stacks, column leans, or other characteristics of a bad stack.

In further examples, the pallet or truck/container may be loaded such that work by human operators in subsequent unloading processes is minimized. For instance, in some embodiments, items may be placed in last in, first out order such that, upon unpacking, the items needed first are on top, the items needed second are one layer down and so on. In other examples, the loading of pallets may be independent of how items flow towards the packing cells. Thus, according to some embodiments, the system can handle packages sent in random order or in an order known in advance. In addition, in some embodiments, systems may adapt to changes in the flow of items on the fly. In further examples, one or more boxes may be recorded and buffered by holding the boxes in a temporary storage area where their order can be changed along the way.

According to various embodiments, a 2D simulator and/or a 3D simulator may be utilized for truck or container loading/unloading or for pallet loading/unloading. In some examples, the state of a stack of boxes may be captured in the physical world and input into the simulator. In some embodiments, a variable size queue of boxes from one to all the boxes may be used by a simulator for finding a next box to pick. For example, a queue of 2 boxes or 4 boxes or 10 boxes may be considered by a simulator.

In further examples, the simulator may search over the boxes in the queue to find the best box placement by heuristic algorithms and/or by brute force or multi-resolution search. In some embodiments, the system may increment with increasingly fine placement of boxes around the best sites found in the previously coarser level. In some embodiments, once placement of particular next box has been determined, a physics planner may be used for motion planning in order to move the box efficiently to the determined locations. In further examples, the physical and simulated stacks may be continuously monitored for quality of the stack (e.g., density, stability, and/or order placement). In some examples, the process may be repeated until all the boxes have been placed or the target container can no longer fit in another box.

Figure 3:
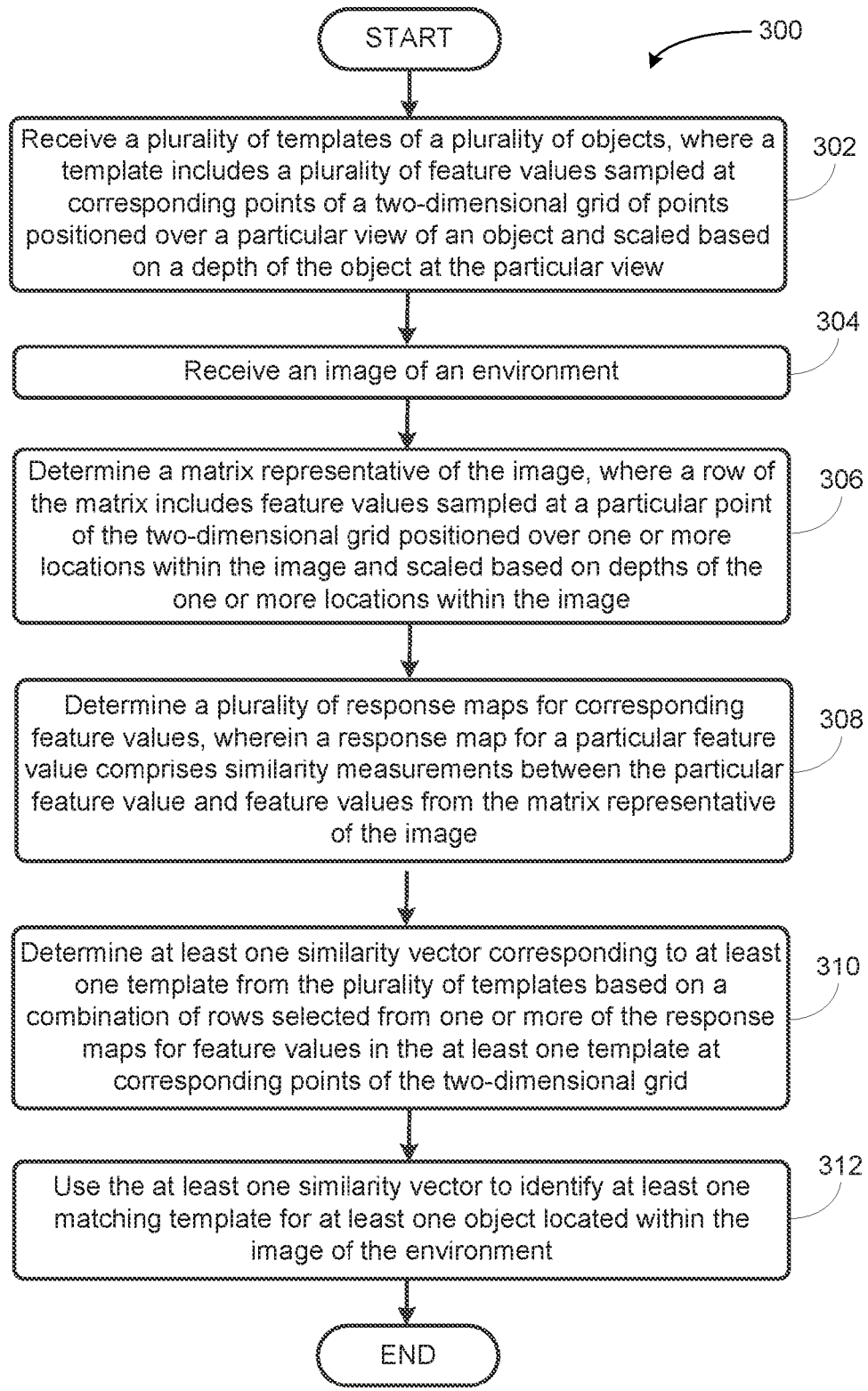
FIG. 3 is a block diagram of a method, according to an example embodiment.

FIG. 3 illustrates a flowchart showing a method 300 that may allow for identification of one or more matching templates for one or more objects, according to an example embodiment. In some examples, method 300 may be carried out by a control system of an autonomous system or a robotic device. For instance, the robotic device may include a robotic arm mounted on a moveable cart and one or more optical sensors to scan the environment, as illustrated and described with respect to FIGS. 1A-1B and 2A-2C. In further examples, part or all of method 300 may be performed by one or more control systems in remote communication with a robotic device. Additionally, while examples involving a robotic manipulator that identifies and moves objects within an environment may be described, various alternative embodiments may include other types of systems that may receive optical sensor data or camera images and identify detected objects as well.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 3. Where used, program code can be stored on any type of computer-readable medium, for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

As shown by block 302 of FIG. 3, method 300 may initially involve receiving a plurality of templates of a plurality of objects. Each template may represent a particular view of a particular object. Additionally, the templates may be scaled based on depth so that only one template may be needed for a particular view of a particular object, regardless of distance to the object. More specifically, a template may include a plurality of feature values sampled at corresponding points of a two-dimensional grid of points that has been positioned over a particular view of an object and scaled based on the depth of the object at the particular view (e.g., the depth of a center pixel from an image taken of the object from a particular direction).

In some examples, the grid dimensions may be scaled relative to a canonical depth, which may be defined once and used throughout a template matching process. In further examples, the canonical depth may set to a largest predicted viewing range for a camera or system. For instance, the canonical depth may be set to 20 meters for a robotic device that is expected to detect objects within a viewing range of 20 meters. If an image of an object is captured where the object has a depth of 10 meters (e.g., by considering the depth of a center pixel from the object within the image), the grid of points may be scaled by a factor of 2 to account for the larger appearance of the object at 10 meters than would exist in an image taken at 20 meters.

In further examples, images used to generate the templates may be captured using a weak perspective camera. More specifically, the camera may be positioned such that for captured images, the diameter of an object is small relative to the distance of the camera to the object. By using a weak perspective camera, perspective distortions on the projection of an object to the image plane may be negligible regardless of the scale at which the object is observed. Therefore, in some examples, it may be assumed that if an object at different scales is projected to the image plane, the projections may be simple object-centered isometric two-dimensional transformations of each other.

In further examples, templates may store one or more types of feature values, which may be quantized at particular points in an image of an object from a particular view. For instance, the feature values may include angles of image gradient vectors within a two-dimensional image of an object from a particular view. The image gradient vectors may represent directions of changing color or intensity within the image. The number of possible feature values for a particular modality may be chosen with different levels of precision. For instance, to represent 360 degrees of possible angles, feature values corresponding to 8 different 45-degree angle ranges or 36 different 10-degree ranges may be used.

In additional examples, other types of feature values may be used as well or instead. For instance, three-dimensional information may also be available for a particular view of a particular object. Directions of surface normals representing normal vectors from the surface of the object may then be encoded and stored in addition to or instead of color gradients. In further examples, other types of features, possibly including normal features, color features, and/or depth features (e.g., relative depth difference) sampled from two-dimensional or three-dimensional images of an object may be used as well or instead. In some examples, feature values from multiple modalities may be combined for more precise object representation.

In further examples, only certain features with strong or discriminative feature values may be stored within templates (e.g., for faster computation time). For instance, image gradient vectors for an image of an object may be sampled at each point within a 10×10 grid of points positioned over an image of the object. However, only certain feature values (e.g., 5 or 15 features values out of 100 sampled values) predicted to distinguish the view of the object from other views of objects may be stored within the template.

In additional examples, templates may be generated at one or more different points in time using one or more computing systems and/or one or more different types of cameras. In some examples, a database of templates may initially be generated, and templates may be added as additional views of known objects are captured. In other examples, a single system (e.g., a robotic device) may itself determine some or all of the templates from captured images to use to identify objects at later points in time. In further examples, templates may be received in stages depending on the types of objects to be identified. For instance, a robot encountering a particular type of environment may request relevant templates from a central control system or from another robot that previously encountered the environment.

FIG. 4A shows an image of an object, according to an example embodiment. More specifically, an image 400 of a toy duck 402 may be used to generate a template of a view of the toy duck 402 from a particular direction. In some examples, the image 400 may include two-dimensional visual information, three-dimensional depth information, or a combination of both. In further examples, multiple different images of the toy duck 402 from the same direction (and possibly different depths) may be used to generate the template. In additional examples, a number of different images of the toy duck 402 from different directions may be used to generate a number of different templates (e.g., so that a similar object can be recognized from a number of different directions in the future).

FIG. 4B shows features from the image of the object from FIG. 4A sampled at a grid of points, according to an example embodiment. More specifically, a grid of points may be positioned over the image 400 of the toy duck 402 and scaled based on a depth of the toy duck 402 (e.g., the depth of a center pixel from the object within the image). The number of points used for the grid of points may be chosen so that the grid of points covers or substantially covers the object within the image. For instance, as shown in FIG. 4B, a 5×5 grid of points may be used to sample feature values from the toy duck 402 within the image 400.

Feature values may sampled from the image 400 at points of the grid that overlap the object 402. The feature values may include numerical representations of any types of features from the image of the object that can be quantified, including color features, depth features, and/or normal features. For instance, as shown in FIG. 4B, image gradient vectors representing magnitudes and/or directions of color and/or intensity changes within the image may be determined at individual points of the grid. For example, image gradient vector 412 may be sampled from image 400 at grid point 410 and image gradient vector 422 may be sampled at grid point 420. In some examples, multiple different types of feature values may be sampled as well.

FIG. 4C illustrates a template for the image of the object from FIG. 4A, according to an example embodiment. More specifically, a template 430 may be generated from the feature values sampled at the grid of points as described with respect to FIG. 4B. Within examples, feature values at corresponding points of the grid may be stored in the template and then may be used at a later point in time to identify an object of the same type.

According to various embodiments, feature values may be quantified and stored in a number of different ways. For instance, as shown in FIG. 4C, the angles of the image gradients pictured in FIG. 4B may be stored in template 430. For example, as an illustration, angle 432 (210 degrees) may represent the angle of image gradient 422 at grid point 420 and angle 442 (60 degrees) may represent the angle of image gradient 412 at grid point 410. In some examples, the angles 432, 442 may be divided into equally sized angle ranges. In additional examples, only certain angles that are predicted to be highly discriminative may be stored within template 430. In further examples, different types of feature values and/or different numerical representations of the feature values may be stored within template 430 as well or instead.

In additional examples, a template may be stored as a list or collection of grid points and corresponding feature values. For instance, a particular template may contain 7 grid points and 7 corresponding feature values sampled from an image of an object at each of the 7 grid points. In further examples, the grid points may be numbered so that a template may store identifying numbers of grid points and corresponding feature values.

Figure 5:
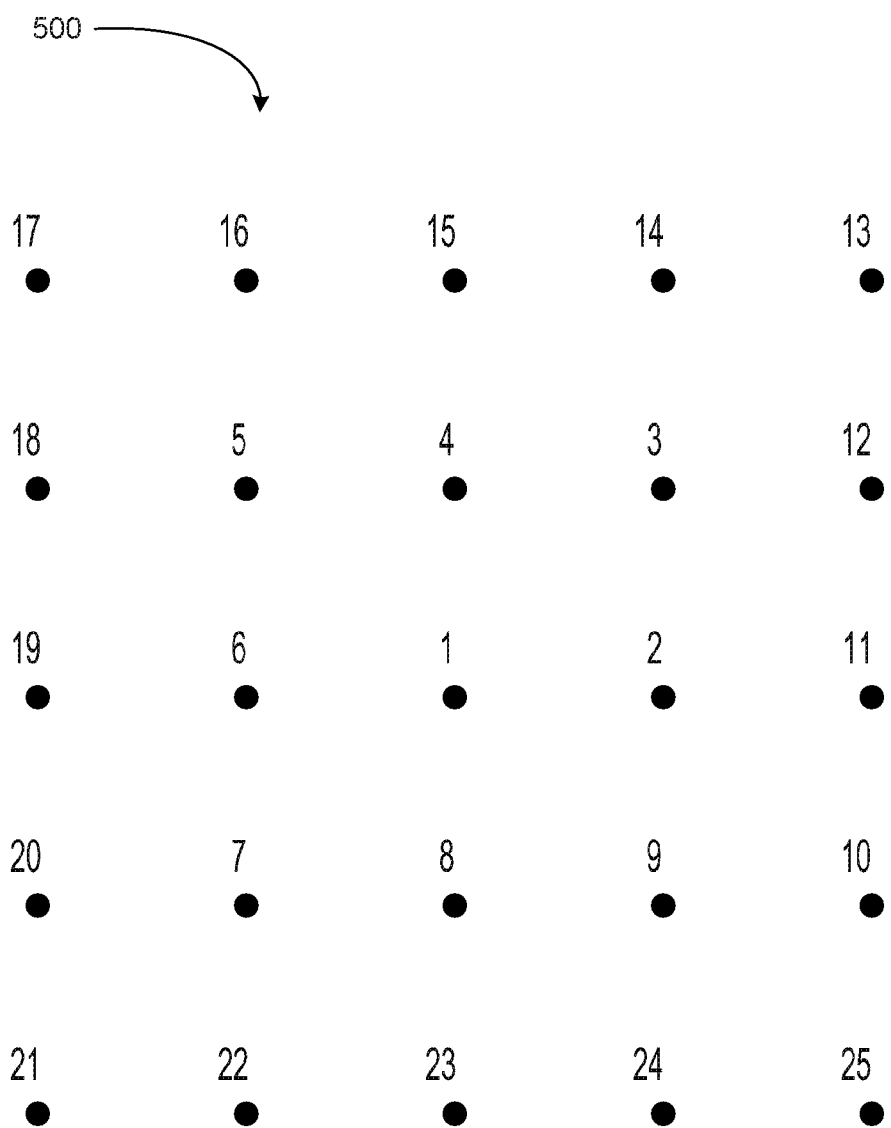
FIG. 5 shows a numbering of points within a grid of points, according to an example embodiment.

FIG. 5 shows a numbering of points within a grid of points, according to an example embodiment. More specifically, an example numbering of a 5×5 grid 500 of points is shown with a numbering that starts at a center point of the grid and increases in a spiral manner as the grid points go away from the center. In some examples, numbering the grid points in a spiral manner may allow the grid size to be adapted during runtime depending on the size of detected objects. In further examples, the grid size may be set to be large enough that it can cover a diameter of the largest object that is expected to be encountered (e.g., by a robotic device).

In other examples, the grid 500 of points could be numbered in other spiral manners that allow the points to increase as they move away from the center point. For instance, the spiral could move in a different direction first rather than right (e.g., left, up, or down) and/or could increase in a clockwise manner instead of a counterclockwise manner. Other types of numbering that increase as the points move outward as well as different types of numberings are also possible.

Referring back to FIG. 3, method 300 may further involve receiving an image of an environment, as shown by block 304. More specifically, the image may be received from one or more optical sensors, possibly including two-dimensional visual information and/or three-dimensional depth information. In some examples, the image may be received from an optical sensor coupled to an autonomous system or robotic device, such as one or more of the optical sensors illustrated and described with respect to FIGS. 1A-1B and 2A-2C. In other examples, the image may be received from an optical sensor positioned at a fixed location within the environment. In further examples, the image may be received at a point in time after the templates have been generated, or it may be received during or before some or all of the templates have been generated.

Figure 6A:
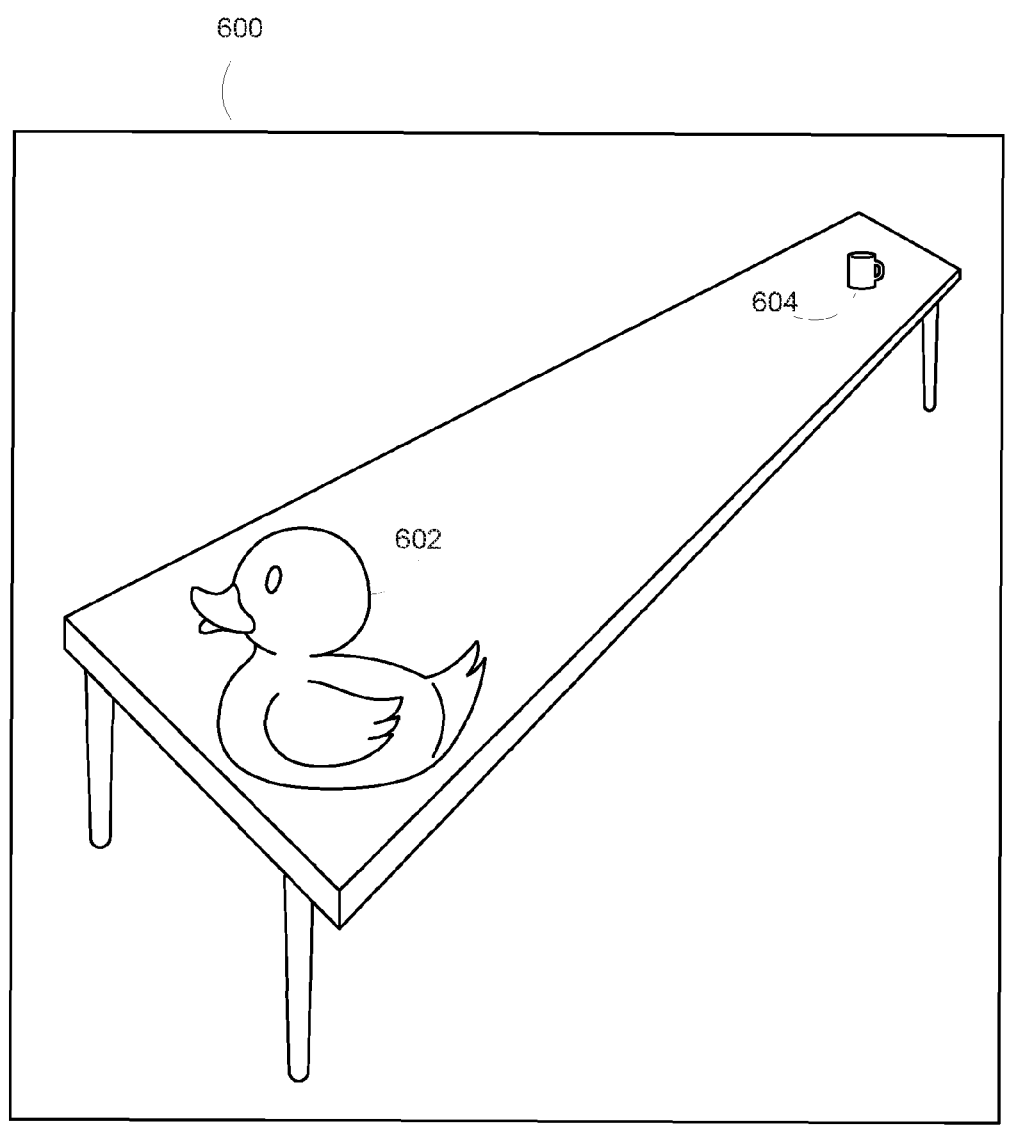
FIG. 6A shows an image of an environment with two objects at different depths, according to an example embodiment.

FIG. 6A shows an image of an environment with two objects at different depths, according to an example embodiment. More specifically, image 600 may be received from an optical sensor, such as an optical sensor used by a robotic device to scan an environment. The image 600 may contain a first object 602 and a second object 604 at different depths such that the first object 602 appears larger than the second object 604 within image 600. In some examples, a weak perspective camera may be assumed so that perspective distortions on the projection of an object to the image plane may be negligible. Additionally, images may be received with many more objects than in the simplified example illustrated in FIG. 6A, including cluttered scenes, textureless objects, partially obscured objects, and/or other potential obstacles to object identification.

Referring back to FIG. 3, method 300 may further involve determining a matrix representative of the image, as shown by block 306. More specifically, the matrix may contain feature values sampled from the image, which may be compared with feature values from templates to identify one or more objects within the environment. In particular, feature values may be sampled at points from a grid of points positioned at one or more locations within the image and scaled based on depths of the one or more locations. In further examples, the grid may contain the same number of points as grid used to generate the templates to be searched, or the largest template to be searched. For instance, to search templates created using a 5×5 grid of points, a 5×5 grid of points may be used to sample one or more locations within the image.

In additional examples, the one or more locations at which to position the grid of points may be equally spaced pixels within the image. For instance, the grid of points may be positioned over every eighth pixel within the image, with every eighth pixel serving as center point of the grid. In further examples, feature values may be spread within the image by combining or averaging together features within a certain neighborhood of a pixel (e.g., by using a binary representation of different possible feature values). For instance, every eighth center pixel may contain feature information from surrounding pixels within eight pixels of the center pixel. In some examples, by spreading feature information across multiple pixels, small deformations in an image may be handled without having to sample the image with the grid of points at every pixel.

In further examples, the one or more locations at which to position the grid of points may be chosen in other ways. For instance, the one or more locations may be chosen to be pixels that are surrounded by neighboring pixels with a similar depth. In some examples, choosing locations where the surrounding depth difference is small may make the template matching process more robust to small variations in translation. Other methods of choosing the one or more locations at which to position the grid of points are also possible, including methods that may leverage prior information about the image or the environment.

Within examples, the rows of the matrix may represent individual points of the grid of points used to sample feature values from the image. For instance, if a 10×10 grid of points is used, the matrix may have 100 rows corresponding to the 100 points of the grid. In some examples, the rows may be ordered based on a numbering of the points within the grid. For instance, the grid points may be numbered as illustrated in FIG. 5 and the rows of the matrix may be ordered to correspond to the numbering of the grid points. In some examples, numbering the grid points in a spiral manner may allow for easy expansion of the matrix to accommodate larger objects.

Additionally, the columns of the matrix may represent the one or more locations within the image from which feature values are sampled using the grid of points. For instance, if the grid of points is centered around 500 different center pixels within the image, then the matrix may have 500 columns corresponding to the 500 different center pixels within the image.

In further examples, the rows of the matrix may be stored linearly within a memory storage. For instance, each row may be stored in a vector or a different type of linear data structure. In some examples, linear storage of the rows may allow for faster computation during a template matching process. In particular, vector operations may be used to simultaneously compare each of the one or more locations within the image (i.e., each column of a row of the matrix) with one or more templates. In some examples, vector operations may allow for faster computation time than performing the operations on individual elements separately.

Figure 6B:
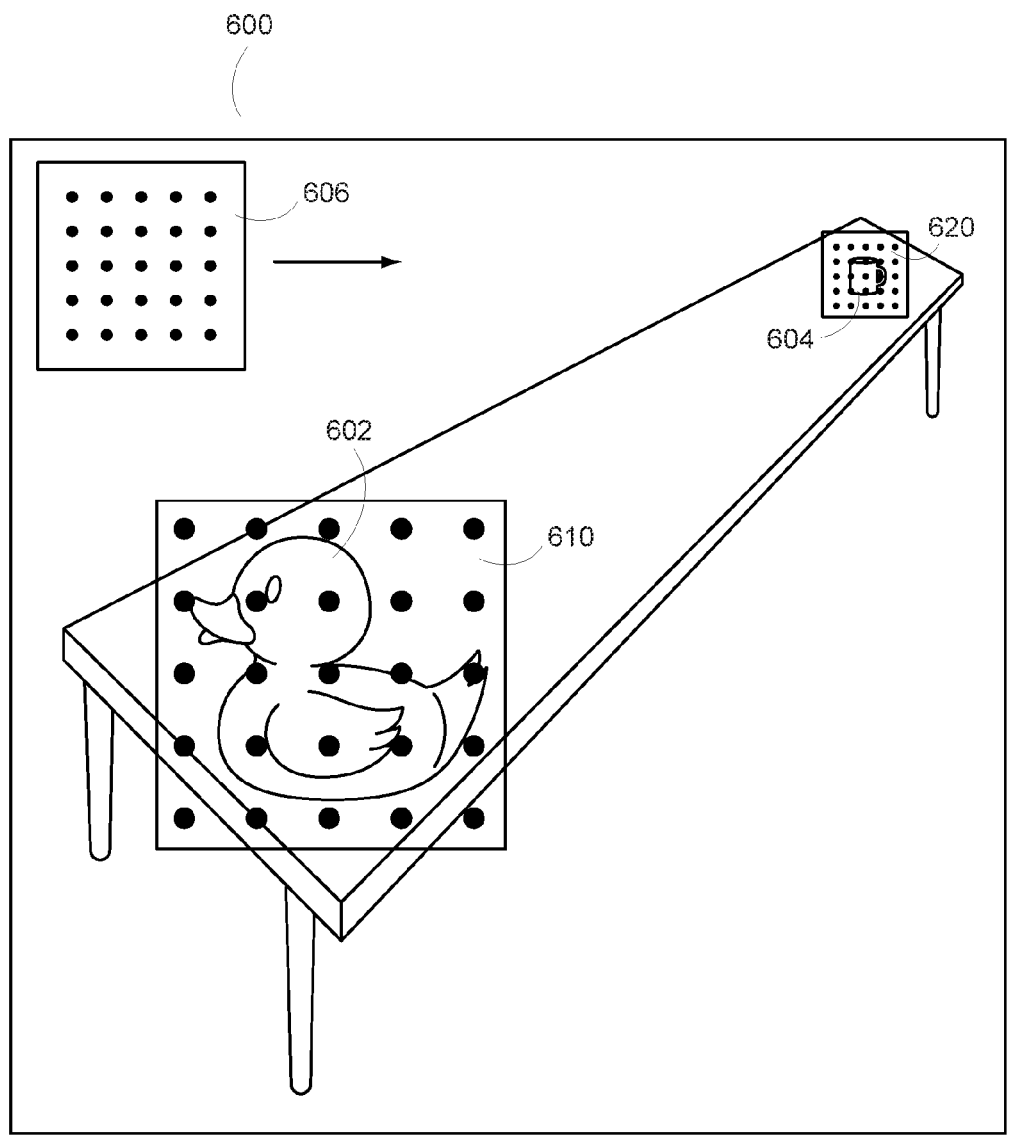
FIG. 6B shows a grid of points scaled based on depths of the two objects from FIG. 6A, according to an example embodiment.

FIG. 6B shows a grid of points scaled based on depths of the two objects from FIG. 6A, according to an example embodiment. More specifically, a grid 606 of points may be used to sample feature values from image 600. The grid 606 of points may contain as many points as the grid used to generate the templates to be searched, or the largest template to be searched. For instance, in this example, the grid 606 may be a 5×5 grid of 25 points. The grid 606 of points may be moved around to one or more locations within the image 600 in order to sample feature values. At each location, the grid 606 of points may be scaled based on a depth of the location. For instance, the depth of a center pixel at the location may be available based on one or more depth sensors, and may be used to scale the grid 606 of points.

Within examples, the locations within the image 600 at which to position the grid 606 of points to sample feature values from the image 600 may be chosen in various ways. In one example, the center of the grid 606 of points may be positioned at equally spaced pixels (e.g., every 5th pixel) within the image 600. In this illustrative example, the grid 606 of points may be positioned over a toy duck 602 within image 600. The grid 606 of points may be scaled based on a depth of a center pixel from the toy duck 602 within image 600 in order to sample feature values from the image 600, resulting in a scaled grid 610 of points. As shown here, the toy duck 602 may be relatively close to a sensor that captured the image 600, in which case the scaled grid 610 of points may be made larger to account for the larger appearance of the toy duck 602 within the image 600.

Additionally, the grid 606 of points may be positioned at one or more other locations within image 600. For instance, the grid 606 of points may be positioned over another object, mug 604, within the image 600. In order to sample feature values at that location, the grid 606 of points may be scaled based on a depth of a center pixel on the mug 604, resulting in the scaled grid 620 of points. As shown here, the mug 604 may be relatively far away from a sensor that captured the image 600, in which case the scaled grid 620 of points may be made smaller in order to account for the smaller appearance of the mug 604 within the image 600.

After placing the grid of points at each location within the image and scaling the grid based on the depth of the location, feature values may be sampled from the image at some or all of the points of the grid. Different types of features and/or different types of numerical representations of features may be sampled from the image depending on the types of features and representations used for the templates for purposes of comparison. For instance, if the templates contain angles of image gradients at different points, then angles of image gradients may also be sampled from the image.

Figure 6C:
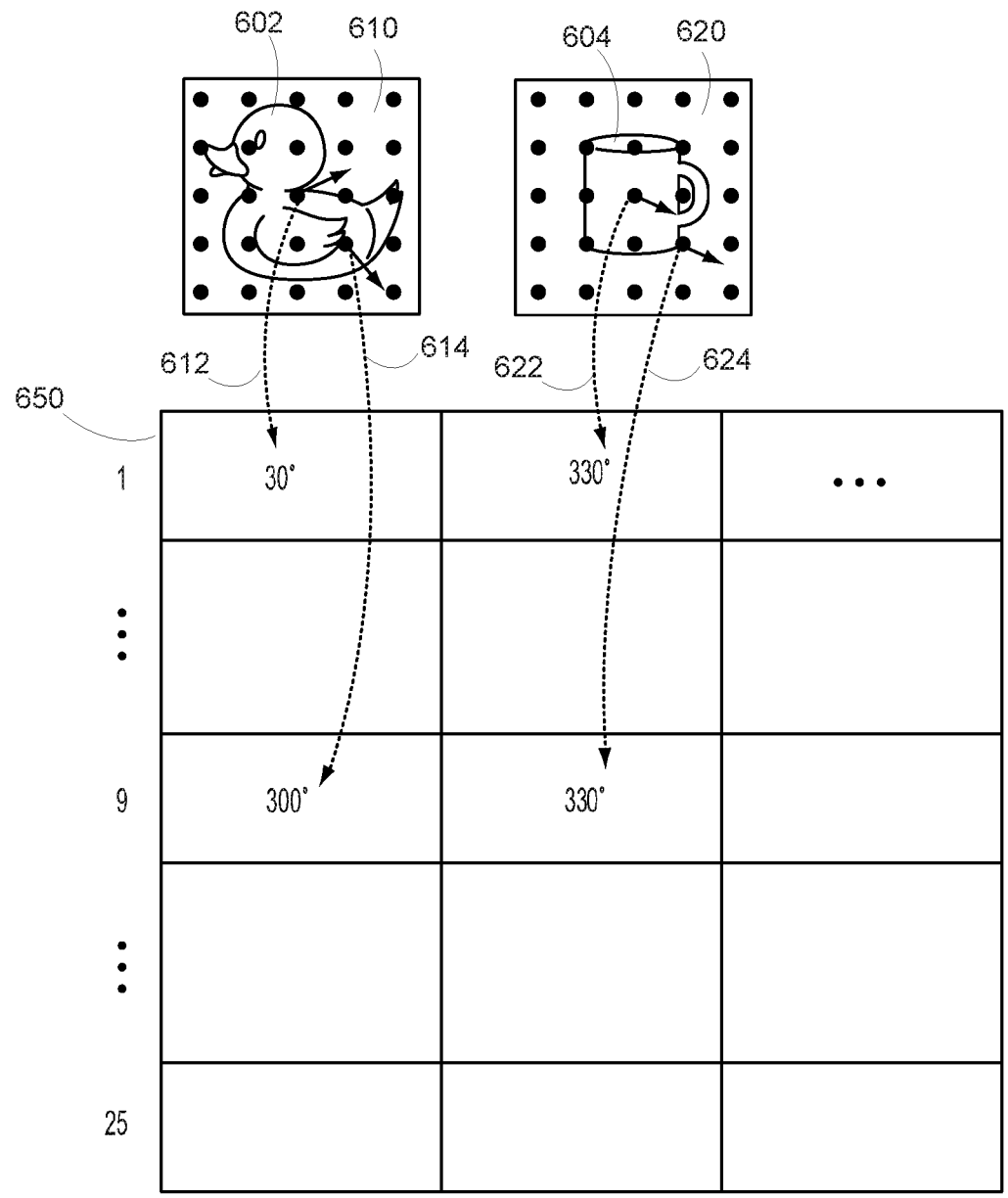
FIG. 6C illustrates a portion of a matrix representative of the image from FIG. 6A, according to an example embodiment.

In further examples, the sampled feature values may be stored in a matrix representative of the image in order to identify matches between a template and a location within the image. FIG. 6C illustrates a portion of a matrix representative of the image from FIG. 6A, according to an example embodiment. More specifically, matrix 650 may be created and stored once for image 600, and may then be used to search a group of templates (e.g. hundreds or thousands of templates) for matches. The rows of matrix 650 may correspond to points of the grid 606 of points used to sample the image 600. In this example, a 5×5 grid of points was used to sample the image, so the matrix 650 may have 25 rows as shown.

Additionally, each column of the matrix 650 may correspond to a location within the image 600 at which feature values were sampled using the grid 606 of points that was scaled based on a depth of the location. For instance, one column may correspond to the image location at which the scaled grid 610 of points was positioned over the toy duck 602 to sample image 600. The sampled feature values taken from the image 600 at each point of the grid 610 may be placed within the column at the rows corresponding to the grid points. For example, if the rows are numbered according to the numbering of grid points previously illustrated in FIG. 5, then an angle of the image gradient at grid point #1 (30 degrees) may be stored in row 1, as shown by arrow 612. Additionally, an angle of the image gradient at grid point #9 (300 degrees) may be stored in row 9, as shown by arrow 614. Feature values sampled at other grid points (not shown in FIG. 6C) may similarly be determined for the other rows of the matrix for the same column. In further examples, the feature values may be encoded using binary representations or other representations as well.

Additionally, another column may correspond to the image location at which the scaled grid 620 of points was positioned over the toy duck 604. The sampled feature values taken from the image 600 at each point of the grid 620 may be placed within the column at the rows corresponding to the grid points. For example, an angle of the image gradient at grid point #1 (330 degrees) may be stored in row 1, as shown by arrow 622. Also, an angle of the image gradient sampled at grid point #9 (330 degrees) may be stored in row 9, as shown by arrow 624. In additional examples, other columns of the matrix may be similarly filled in based on sampling from other locations within the image.

Referring back to FIG. 3, method 300 may further involve determining a plurality of response maps for corresponding feature values, as shown by block 308. In order to determine the similarity between a template and a particular sampled image location, the feature values at different grid points from the template may be compared to corresponding feature values from the column of the matrix representing the particular image location. To facilitate these comparisons of feature values, response maps may be generated for each possible feature value for each modality. A response map for a particular feature value may be a lookup table containing similarity measurements between the particular feature value and each feature value in the matrix representative of the image. Like the matrix, rows of the response maps may be stored linearly in memory.

In further examples, similarity measurements may be any numerical representation of similarity between features. For instance, the similarity measurements between two feature values may be determined using a similarity function resulting in a 0-to-1 index, where 1 indicates an exact match between the features and an index value greater than 0 but less than 1 indicates features that are similar, but not an exact match. As a specific example, if color gradient angles are used as feature values, the cosine of the difference angle may be a similarity function to determine how close two angles are together.

FIG. 6D illustrates a portion of an example response map, according to an example embodiment. More specifically, a response map 660 may be generated for a particular feature value of 30 degrees. Similarity measurements for the response map 660 may be determined by comparing the particular value of 30 degrees to feature values from the matrix show in FIG. 6C. For instance, in one example, the cosine of the difference between the feature value (30 degrees) and each angle in the matrix may be precomputed and stored within response map 660. Row one of the response map 660 may then contain similarity values between 30 degrees and each angle sampled from the image at grid point #1. For instance, the two columns shown may represent the similarity between 30 degrees and the angle at grid point #1 at each of the two locations sampled as illustrated in FIG. 6B. Similarly, row nine of the response map may contain similarity values between 30 degrees and each angle sampled from the image at grid point #9.

FIG. 6E illustrates another example of a response map, according to an example embodiment. More specifically a second response map 670 may be generated for another possible feature value of 300 degrees. Similarity measurements for the response map 670 may be determined by comparing the particular value of 300 degrees to feature values from the matrix. For instance, row one of the response map 670 may then contain similarity values between 300 degrees and each angle sampled from the image at grid point #1. For instance, the two columns shown may represent the similarity between 300 degrees and the angle at grid point #1 at each of the two locations sampled as illustrated in FIG. 6B. Similarly, row nine of the response map may contain similarity values between 300 degrees and each angle sampled from the image at grid point #9. In some examples, a response map may be determined for each possible feature value in each modality used by the template matching system.

Referring back to FIG. 3, method 300 may further involve determining at least one similarity vector corresponding to at least one template from the plurality of templates, as shown by block 310. In particular, after determining a matrix representative of an image, one or more templates may be compared to each sampled image location to see if the image contains any objects matching a template. Within examples, a similarity vector for a template may contain a numerical representative indicative of an amount of similarity between the template and each sampled image location.

In further examples, the similarity vector for a given template may be determined by combining the rows of similarity measurements selected from one or more of the response maps. More specifically, a row for a given grid point may be selected from a response map for the feature value contained within a template at the given grid point. For instance, if the template has feature values at five different grid points, five rows from response maps for each of the feature values corresponding to those five grid points may first be selected. The rows or vectors of similarity measurements may then be combined in order to produce an overall similarity vector between a template and the image.

According to various examples, the vectors of similarity measurements for different grid points may be combined in different ways. In some examples, the corresponding elements may be summed together or averaged together. In other examples, the similarity measurements may represent probabilities of a match, in which case the corresponding similarity measurements in a given column from each vector may be multiplied together instead. In further examples, the vectors of similarity measurements may be stored linearly in memory (e.g., by determining the vectors using rows of the matrix and response maps which are stored linearly in memory), which may allow vector operations to be used to simultaneously combine each of the vectors of similarity measurements for greater efficiency.

Figure 7A:
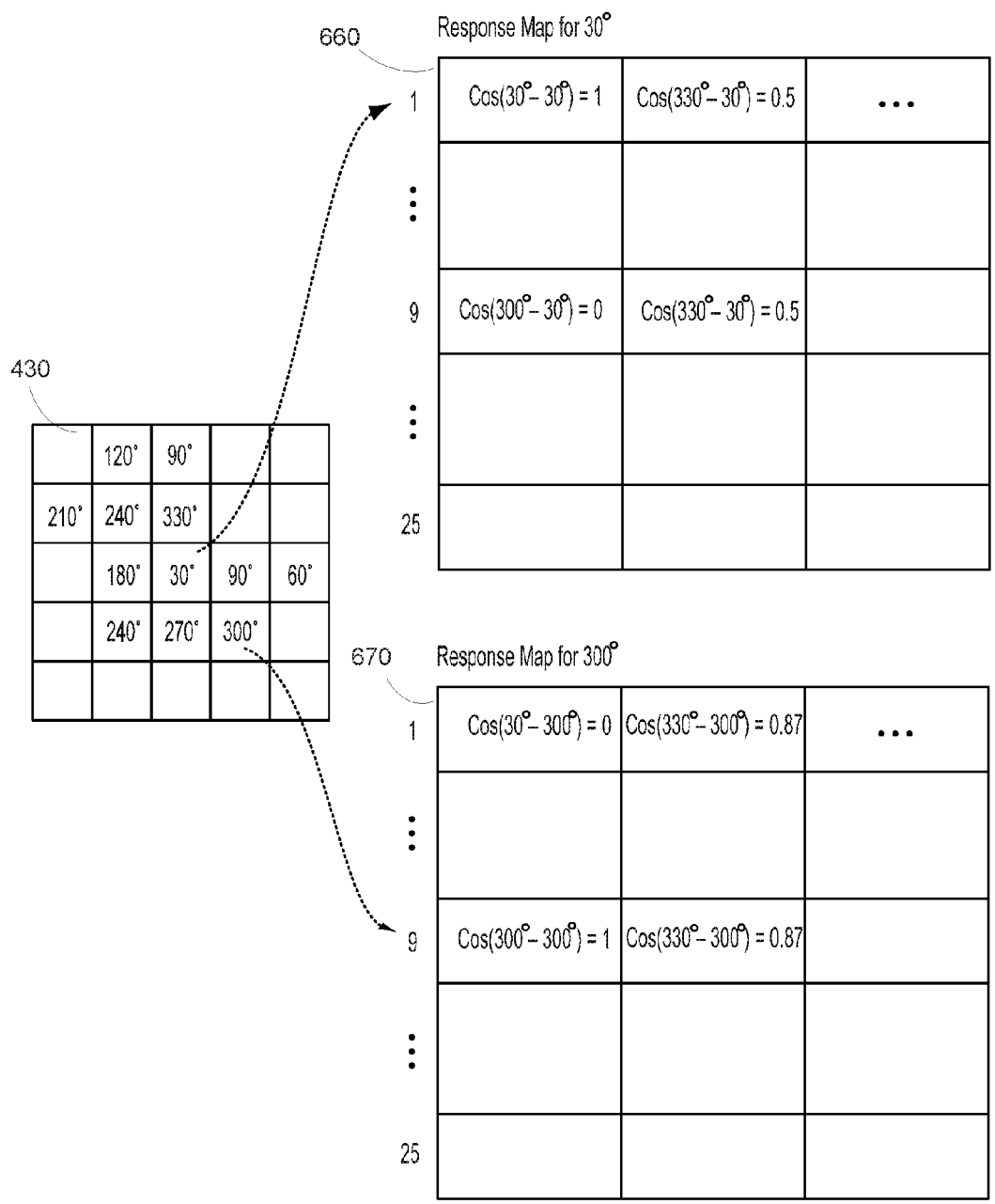
FIGS. 7A-7B illustrate selection of rows from response maps, according to an example embodiment.
Figure 7B:
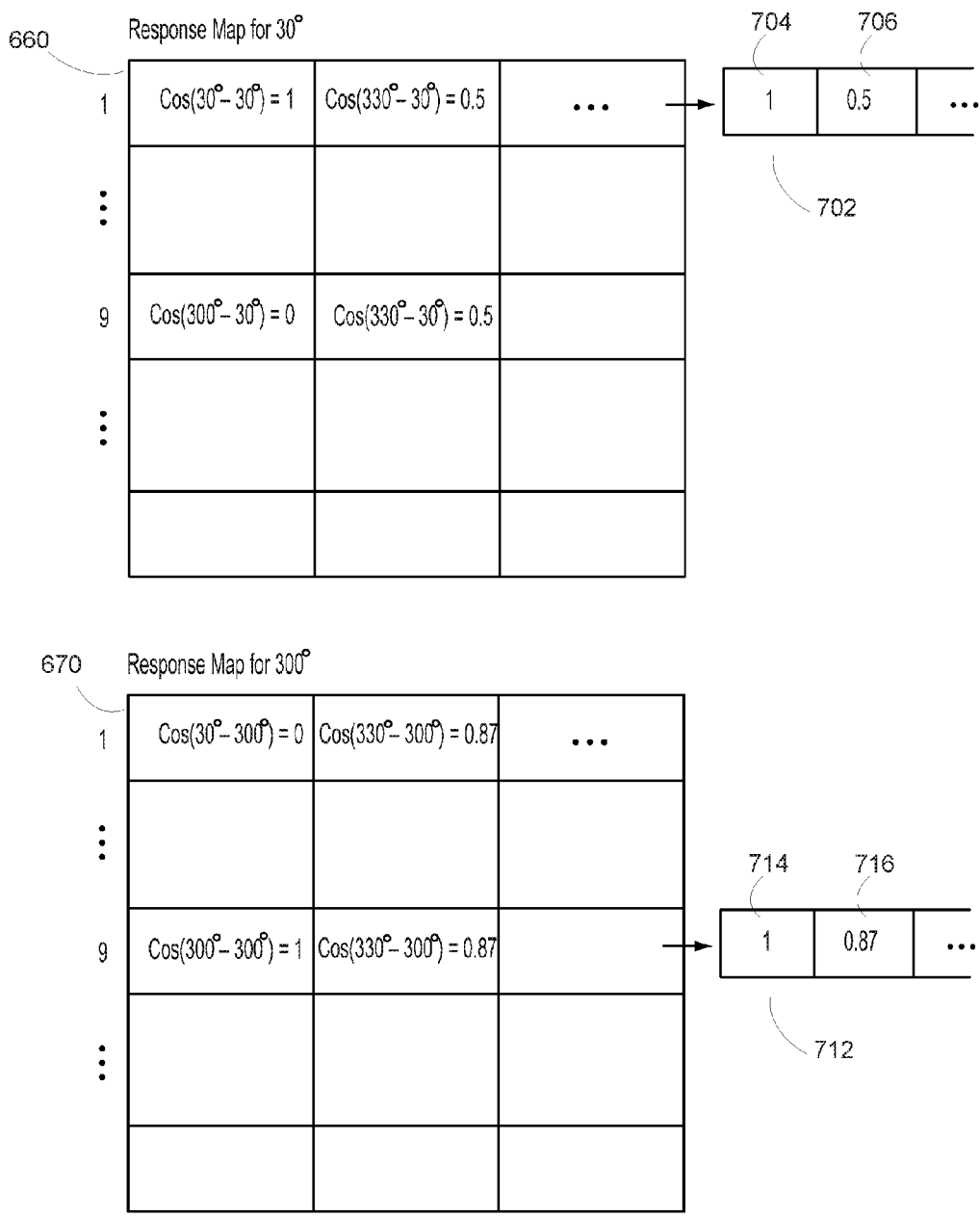

FIGS. 7A-7B illustrate selection of rows from response maps, according to an example embodiment. More specifically, in reference to FIG. 7A, response maps 660 and 670 based on the matrix 650 representative of an image may be used to search for objects within the image that match template 430. A feature value for a particular grid point from template 430 may be used to select a particular response map from all available response maps. For instance, as an illustration, the feature value of 30 degrees for grid point #1 within template 430 may be used to select the first row from response map 660. Additionally, the feature value of 300 degrees for grid point #9 within template 430 may be used to select the ninth row of the response map 670. Other feature values from the template may be used to select rows from response maps in a similar manner.

FIG. 7B illustrates the rows or vectors of similarity measurements resulting from selections as illustrated in FIG. 7A, according to an example embodiment. More specifically, vector 702 may represent similarity measurements between the template and each sampled location in the image at sampled grid point #1. For instance, similarity measurement 704 in row 1 for the column corresponding to the location in the image containing the toy duck may be 1, indicating matching feature values with the template for grid point #1. Additionally, similarity measurement 706 in row 1 for the column corresponding to the location in the image containing the mug may be 0.5, indicating a relatively weak match with the template for grid point #1.

Furthermore, vector 712 may represent similarity measurements between the template and each sampled location in the image at sampled grid point #9. For instance, similarity measurement 714 in row 9 for the column corresponding to the location in the image containing the toy duck may be 1, indicating matching feature values with the template for grid point #9. Furthermore, similarity measurement 716 in row 9 for the column corresponding to the location in the image containing the mug may be 0.87, indicating a partial match with the template for grid point #9. Additional vectors of similarity measurements for the other grid points may be determined in a similar manner.

Figure 7C:
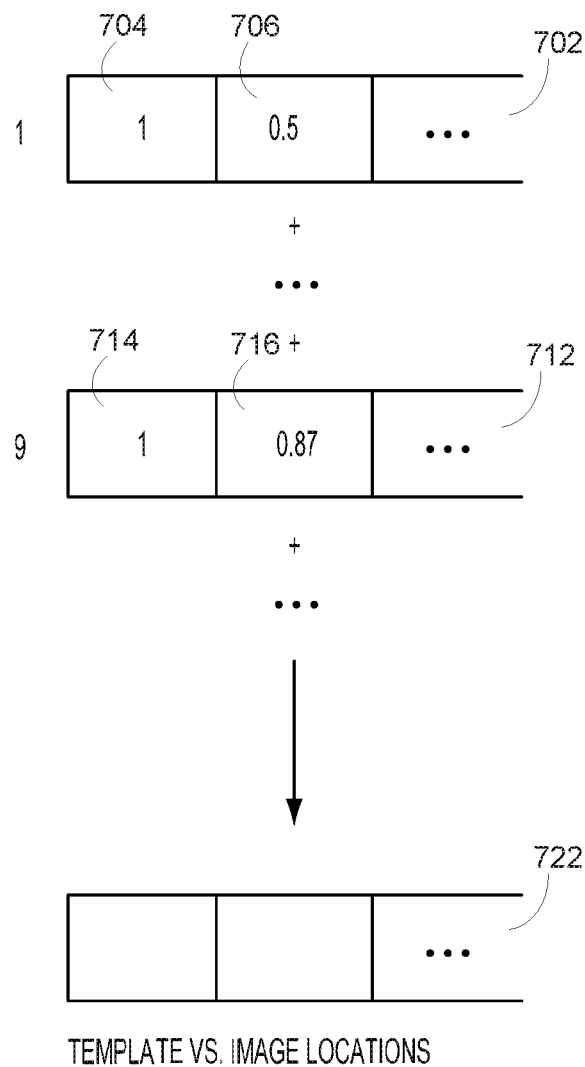
FIG. 7C illustrates a portion of a similarity vector, according to an example embodiment.

FIG. 7C illustrates a similarity vector resulting from combining the vectors of similarity measurements from FIG. 7B, according to an example embodiment. More specifically, vectors of similarity measurements representing the similarity between the template and each sampled image location at particular grid points may be combined to determine a single similarity vector between the template and each sampled image location. For instance, vector 702 and vector 712 may be combined along with vectors for other grid points to produce a single similarity vector 722 indicative of the likelihood of a match between template and each sampled image location. In some examples, the vectors may be combined by adding each corresponding element (e.g., a vector sum) or averaging each corresponding element (e.g., a mean vector). In other examples, the vectors may be combined in other ways, such as by multiplying each corresponding element.

Referring back to FIG. 3, method 300 may additionally involve using the at least one similarity vector to identify at least one matching template for at least one object located within the image of the environment, as shown by block 312. In particular, a strong response value in a similarity vector for a particular template may indicate a match or a likely match at the image location corresponding to the column of the similarity vector containing the strong response value. In some examples, a strong response value may be identified by comparing response values to a threshold value that indicates a likely match. In further examples, multiple matching templates for one or more objects may be found within a single image. In additional examples, possible matches may be confirmed or refuted using additional images or additional templates representing other views of an object.

Referring again to FIG. 7C, the first column in similarity vector 722 may contain a strong response value after combining the vectors of similarity measurements from each grid point. The strong response value may indicate a likely match between the template for the image of the toy duck and the similar toy duck located within the image of the environment. Additionally, the match may be identified in cases where the image of the toy duck used to create the template was taken at a different depth from that of the toy duck within the image of the environment.

In additional examples, the response maps may be stored in matrix form. For instance, a grid with 700 points may be used to sample 4800 locations of a VGA image (e.g., each 8th pixel position). The resulting matrix may then have dimensions of 700×4800. If a single modality is used with 12 different features, 12 response maps of dimension 700× 4800 may be needed. To compute similarity for a template with 128 different features, 128 rows of size 4800 may need to be combined (e.g., added). Because the needed memory may be large (e.g., 12×700×4800×size of(matrix_element)), it may be necessary to jump from one row to another for each new feature value. This jumping may be cache inefficient (especially because 12×700×4800×size of(matrix_element) likely may not fit into cache).

In such examples, the large matrices may be split into smaller matrices, referred to as pages. For instance, each page could have dimension 12×700×8 (e.g., instead of storing all 4800 locations of an image, only 8 per page may be stored). Jumping around within the matrix may then be more efficient because one page may fit into the cache of modern CPUs. Additionally, one page may allow computation of the similarity of eight different locations. Accordingly, both cache efficiency and linear memory for the use of vectorized operations (e.g., SSE) may be obtained. In addition, computation of the similarity measures may be stopped early if it is determined that none of the eight different locations can possibly contain an instance of the object. It therefore may only be necessary to check from time to time if all of the eight locations are below a certain threshold such that none of them can possibly reach the final threshold needed for a match. In that case, computing the similarity for the specific page may be stopped, resulting in a speed advantage with little additional cost.

In further examples, a robotic device may use templates to identify objects to interact with in the environment. For instance, a robotic device may capture an image of its environment, determine a matrix representative of the image as described herein, and then use the matrix to search hundreds or thousands of templates to identify nearby objects, including information such as types, shapes, and/or sizes of objects. In some examples, the robotic device may use information regarding identified objects to determine one or more objects to pick up and/or move within the environment.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of method 300 described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
   receiving, at a computing device, a plurality of templates of a plurality of objects, wherein a template of an object comprises a plurality of feature values sampled at corresponding points of a two-dimensional grid of points positioned over a particular view of the object and scaled based on a depth of the object at the particular view;
   receiving, at the computing device, an image of an environment;
   determining, by the computing device, feature values sampled at each point of the two-dimensional grid when the two-dimensional grid is positioned over a plurality of locations within the image of the environment and scaled based on respective depths of the plurality of locations within the image of the environment; and
   identifying, by the computing device based on the determined feature values, a matching template from the plurality of templates for a particular object located at one of the plurality of locations within the image of the environment.

2. The method of claim 1, wherein the image of the environment is received from an optical sensor, and wherein the two-dimensional grid is scaled relative to a canonical depth that is chosen based on a predicted viewing range of the optical sensor.

3. The method of claim 1, wherein the plurality of feature values in each template of the plurality of templates comprise angles of two-dimensional gradient vectors representative of directional color changes.

4. The method of claim 1, wherein the plurality of locations within the image comprise equally spaced pixels within the image.

5. The method of claim 1, further comprising determining a matrix representative of the image, wherein a row of the matrix comprises the feature values sampled at a particular point of the two-dimensional grid positioned over the plurality locations within the image and scaled based on the respective depths of the plurality of locations within the image; and
   using the matrix representative of the image to identify the matching template for the particular object.

6. The method of claim 5, further comprising storing the matrix in a memory storage, wherein the rows of the matrix are stored linearly within the memory storage.

7. The method of claim 5, wherein the rows of the matrix representative of the image are ordered based on a numbering of the points of the two-dimensional grid, wherein the numbering starts at a center point of the two-dimensional grid and increases according to a spiral of grid points extending from the center point.

8. The method of claim 7, further comprising:
   determining additional feature values from plurality of locations within the image at a plurality of additional grid points, wherein the plurality of additional grid points expand the two-dimensional grid; and
   determining a plurality of additional rows for the matrix comprising the additional feature values, wherein the plurality of additional rows are ordered by numbering the plurality of additional grid points according to the spiral of grid points.

9. The method of claim 8, further comprising:
   identifying an object at a location from the plurality of locations within the image that is outside of the two-dimensional grid positioned over the location and scaled based on the depth of the location; and
   adding the plurality of additional grid points to expand the two-dimensional grid to cover the identified object.

10. A non-transitory computer readable medium having stored therein instructions, that when executed by a computing system, cause the computing system to perform functions comprising:
    receiving a plurality of templates of a plurality of objects, wherein a template of an object comprises a plurality of feature values sampled at corresponding points of a two-dimensional grid of points positioned over a particular view of the object and scaled based on a depth of the object at the particular view;
    receiving an image of an environment;
    determining feature values sampled at each point of the two-dimensional grid when the two-dimensional grid is positioned over a plurality of locations within the image of the environment and scaled based on respective depths of the plurality of locations within the image of the environment; and
    identifying, based on the determined feature values, a matching template from the plurality of templates for a particular object located at one of the plurality of locations within the image of the environment.

11. The non-transitory computer readable medium of claim 10, wherein the image of the environment is received from an optical sensor, and wherein the two-dimensional grid is scaled relative to a canonical depth that is chosen based on a predicted viewing range of the optical sensor.

12. The non-transitory computer readable medium of claim 10, wherein the plurality of feature values in each template of the plurality of templates comprise numerical representations of normal vectors from surfaces of objects.

13. The non-transitory computer readable medium of claim 10, wherein the plurality of locations within the image comprise equally spaced pixels within the image.

14. The non-transitory computer readable medium of claim 10, the functions further comprising determining a matrix representative of the image, wherein a row of the matrix comprises the feature values sampled at a particular point of the two-dimensional grid positioned over the plurality locations within the image and scaled based on the respective depths of the plurality of locations within the image; and
using the matrix representative of the image to identify the matching template for the particular object.

15. The non-transitory computer readable medium of claim 14, the functions further comprising storing the matrix in a memory storage, wherein the rows of the matrix are stored linearly within the memory storage.

16. The non-transitory computer readable medium of claim 14, wherein the rows of the matrix representative of the image are ordered based on a numbering of the points of the two-dimensional grid, wherein the numbering starts at a center point of the two-dimensional grid and increases according to a spiral of grid points extending from the center point.

17. The non-transitory computer readable medium of claim 16, the functions further comprising:
determining additional feature values from plurality of locations within the image at a plurality of additional grid points, wherein the plurality of additional grid points expand the two-dimensional grid; and
determining a plurality of additional rows for the matrix comprising the additional feature values, wherein the plurality of additional rows are ordered by numbering the plurality of additional grid points according to the spiral of grid points.

18. A system, comprising:
at least one optical sensor;
at least one processor; and
a non-transitory computer readable medium having stored therein instructions, that when executed by the at least one processor, cause the at least one processor to:
receive a plurality of templates of a plurality of objects, wherein a template of an object comprises a plurality of feature values sampled at corresponding points of a two-dimensional grid of points positioned over a particular view of the object and scaled based on a depth of the object at the particular view;
receive, from the at least one optical sensor, an image of an environment;
determine feature values sampled at each point of the two-dimensional grid when the two-dimensional grid is positioned over a plurality of locations within the image of the environment and scaled based on respective depths of the plurality of locations within the image of the environment; and
identify, based on the determined feature values, a matching template from the plurality of templates for a particular object located at one of the plurality of locations within the image of the environment.

19. The system of claim 18, wherein the instructions are further executable by the at least one processor to scale the two-dimensional grid relative to a canonical depth that is chosen based on a predicted viewing range of the at least one optical sensor.

20. The system of claim 18, further comprising a robotic manipulator, wherein the instructions are further executable by the at least one processor to use the matching template for the particular object to provide instructions to cause the robotic manipulator to move the particular object.

* * * * *